US007315985B1

(12) United States Patent
Gauvin et al.

(10) Patent No.: US 7,315,985 B1
(45) Date of Patent: Jan. 1, 2008

(54) METHODS AND APPARATUS FOR MANAGING NETWORK RESOURCES USING A NETWORK TOPOLOGY VIEW

(75) Inventors: Francois Gauvin, Salem, MA (US);
Joshua Onffroy, Norton, MA (US);
Morrie Gasser, Hopkinton, MA (US);
Ketan Shah, Worcester, MA (US);
Hanna Yehuda, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 919 days.

(21) Appl. No.: 10/335,330

(22) Filed: Dec. 31, 2002

(51) Int. Cl.
*G06F 3/00* (2006.01)
*G06F 9/00* (2006.01)
*G06F 17/00* (2006.01)

(52) U.S. Cl. .................... 715/734; 715/764; 715/853
(58) Field of Classification Search ............. 715/853, 715/764, 734
See application file for complete search history.

(56) References Cited

U.S. PATENT DOCUMENTS 6,952,208 B1 * 10/2005 Arquie et al. ............... 345/440

* cited by examiner

*Primary Examiner*—Kristine Kincaid
*Assistant Examiner*—Boris Pesin
(74) *Attorney, Agent, or Firm*—Chapin IP Law, LLC; Barry W. Chapin, Esq.

(57) ABSTRACT

Mechanisms and techniques provide a system for visualization of manageable network resources in a graphical user interface. The system displays a host element in a host display area, a storage element in a storage display area, and a connectivity element in a network display area of the network topology view on the display of the computerized device. The system displays the network display area in between the host display area and the storage display area. The system determines a coupling condition of the connectivity element in relation to at least one of the host element and the storage element and displays the coupling condition as a link on the display of the computerized device between the connectivity element and either or both of the host element and the storage element to which that coupling condition relates in order to visually convey the coupling condition to a user viewing the network topology view on the display of the computerized device.

47 Claims, 17 Drawing Sheets

METHODS AND APPARATUS FOR MANAGING NETWORK RESOURCES USING A NETWORK TOPOLOGY VIEW

FIELD OF THE INVENTION

The present invention generally relates to computer and software systems that have a graphical user interface, and more particularly, to systems and techniques that allow for management of network resources using a graphical user interface.

BACKGROUND OF THE INVENTION

Conventional computerized devices can operate software application programs that include a conventional graphical user interface (GUI) that allows a user of the computerized device to graphically manage, control and configure various types of hardware and software resources within computerized devices or devices coupled via a computer network. Such network management software application programs typically operate on or within a management workstation computerized device or console coupled to the computer network. The network management application renders the graphical user interface that allows, for example, a user of the management workstation to graphically select, interact with, and manage local or remote devices and associated software processes operating within the network. As an example, the user can use the graphical user interface in combination with an input device such as a hand operated mouse pointer to graphically select and manage filesystem(s), databases, storage devices, peripherals, network data communications devices and the like. The user selects a visual icon representation of such resources on the graphical user interface and applies management commands to this selected icon to carry out intended management functions on the selected network resource. In response, the network management application transmits device or program specific commands to the user selected managed resource to cause this resource to remotely carry out the intended management operation chosen by the user.

Many conventional network management applications provide a topological view or visual representation of the layout or connected configuration of managed resources within a network. As an example, the network may contain a number of computer servers, data communications devices (e.g., switches, routers, etc.), network attached storage devices, proxy devices, firewall devices, and so forth that are all coupled or linked together in a certain configuration or arrangement using a number of data communications links (e.g., physical cables). The conventional management application can access a database that contains data structures that describe and define how these resources are interconnected with each other within the network. The management application can use this information to render a graphical picture of the networked devices as individual icons coupled to each other with lines that represent the data communications links.

SUMMARY OF THE INVENTION

Conventional network management software applications and computerized devices that provide graphical user interfaces for management and visual representation of manageable network resources suffer from a variety of deficiencies. In particular, conventional network management software applications do not uniformly present network topology views in a consistent and optimal manner for ease of use by a user of such software applications. More specifically, conventional network management applications that render network topology views either randomly place representations of resources, such as icons, within the graphical view that represents the network or such applications conform the network topology view to a geographical or star-like configuration in an attempt to best represent the actual network layout or physical placement of devices. Each of these conventional techniques for displaying a network topology or interconnection of manageable network resources suffer from deficiencies due in large part to a lack of ergonomic considerations given to a user's ability to visually scan, identify, select and then apply management commands to specific manageable network resources of interest to that user within such conventional network views. That is, conventional network topology views make it difficult for a user to identify and then select particular managed resources of interest due to the complex graphical layouts that such conventional applications provide.

To illustrate an example of deficiencies experienced by conventional network management applications, such conventional applications may render a number of icons representing various host computerized devices coupled via a data communications device as a star topology within a network view. In such a conventional star topology network view, the application may arrange host icons in a circumference around a central icon representing the data communications device. If a user viewing this conventional network topology view desires to perform a management operation on a selection of certain host devices arranged in the star topology view, the user is required to visually scan the icons around the perimeter of the circumference in order to identify and select the host computers of interest. This circular scanning process can become confusing and time-consuming to the user in situations in which there are many host icons present in the conventional star topology or in situations where the star topology is so large as to not be able to completely fit onto the screen or display. Since the host icons are not arranged in any one central location or list nor in any particular order or grouping for easy user selection, the user must put considerable mental effort and thought into selection of the specific host devices of interest by viewing all devices in a circle around the central data communications device. If two devices are of interest to the user for application of a single command to both device and they are located on opposite sides of the star, the user must navigate across the display while maintaining a selection of the first device in order to retrieve the selection of the second device. This process is time consuming and cumbersome for the user.

As another example of deficiencies in conventional network management graphical user interface displays of networks, consider a conventional network management application that attempts to arrange icons in a network view according to approximate geographic (i.e., physical) locations of the devices that those icons represent. In one area of such a conventional network view, the conventional network management application may render a certain number of host icons, data communications device icons and storage icons in a clustered area of the graphical user interface to represent or convey the fact that physical devices corresponding to these clustered icons are all located within a particular physical area of a network, such within a single building, laboratory or other facility. In another area of the graphical network view, the conventional network management application may render another cluster of host icons, data communications device icons and storage device icons to represent a collection of physical devices located in another physical facility or location. In this manner, the conventional network management application attempts to arrange the network view according to the actual physical layout of the network in order to convey to the user (i.e., a network manager) where the particular devices are actually located.

While this conventional geographical-based network view may provide ease of device location for the network manager should he or she need to physically attend to the device, since the primary function of the network management software is to remotely manage the devices, such conventional geographical-based network topology views suffer a similar problem as the star-topology view when used for remote resource management. That is, the user is required to visually scan and navigate an input selection device such as a mouse pointer to diverse regions of the graphical network view in order to select resources of a common type for application of a resource management command to all of the selected devices. By way of example, suppose the network manager desires to configure or reconfigure a particular group of storage system devices into a common zone for access control purposes. The actual individual storage devices may be physically located in different geographically diverse locations within the corporate network infrastructure or network layout. As a result, the conventional geographic-based network topology view will attempt to render a network view that illustrates this physical network layout to the user viewing the display. This conventional network view requires the user to visually scan through the entire network topology view (and possibly scroll through many pages in many directions such as up, down right and left if the network is large and will not fit on one screen) in order to identify and select the correct icons that represent the storage devices within the zone of interest in order to perform a selected management zone function on the devices. This process of finding devices of interest is time-consuming for the user and can suffer from inaccuracies if a user fails to select an icon representing a device that should have been subject to the particular management operation desired by the user but that user did not see that device. This may happen, for example, in situations where the user inadvertently failed to scroll or otherwise product a view of a certain area of the network that happened to contain an icon representing a device that should have been included in the zone. Accordingly, the deficiencies of conventional graphical displays of network topologies and layouts can result in difficulties and potentially mismanagement of the network resources.

Further still, conventional network topology views that position icons based upon geographic references or that position icons randomly or in geometric configurations such as star topologies do not provide a user with an ability to quickly perform tasks such as quickly identifying and grouping related devices into a single logical entity and then condensing the network topology view to show a single icon representing that group of devices.

Embodiments of the invention significantly overcome the aforementioned and other deficiencies of conventional network display and management systems and provide significant advancements in the state-of-the-art for rendering network topology views for management of resources within a network such as a storage area network. In particular, embodiments of the invention provide mechanisms and techniques for visualizing elements of a network within a network topology view on a display of a computerized device. The computerized device may be, for example, a network management workstation that performs embodiments of the invention within network a management software application that presents, during runtime, a graphical user interface including a network topology view (i.e., a visual representation) of a network such as a storage area network for use by the user such as a network manager to manage resources within that network. Embodiments of the invention include network management software incorporating the functionality explained herein, as well as computerized devices configured to operate as explained herein. Embodiments of the invention also include methods of performing processing steps of operations to carry out the techniques explained herein.

One such method embodiment provides a method for visualizing elements within a network topology view on a display of a computerized device. This method comprises displaying a host element(s) (e.g., one or more icons representing one or more manageable host related devices such as server computers in the network) in a host display area of the network topology view on the display of the computerized device. The host display area is a designated region of a graphical user interface within the network topology view in which all host elements are displayed for host-related managed resources within the network. The method further displays a storage element(s) (e.g., one or more icons representing manageable storage related devices such storage arrays in the network) in a storage display area of the network topology view on the display of the computerized device. In a similar manner, the storage display area is a designated region of the graphical user interface in which embodiments of the invention display any storage elements such as icons to represent managed storage devices within the network such as storage arrays, network attached storage and the like. The method further displays a connectivity element(s) (e.g., one or more icon representing manageable connectivity related devices such as network switches or routers) in a connectivity display area of the network topology view on the display of the computerized device.

According to embodiments of the invention, the connectivity display area is displayed in between the host display area and the storage display area on the display of the computerized device. In this manner, by displaying connectivity elements in between host elements and storage elements, the logical flow of data to and from host computer (e.g., servers) and storage systems (e.g., large storage arrays) through connectivity devices such as storage area network switches, embodiments of the invention clearly depict a representation of a network that provides for more optimal user interaction than conventional graphical network displays. In one embodiment of the invention, the host display area, the connectivity display area and the storage display area are arranged in a linear manner (e.g., horizontally from left to right) within the network topology view such that, for example, all host elements representing host-related resources are on the left hand side of the network topology view, while all connectivity elements representing any connectivity-related devices (e.g., switches, switch ports, etc.) are shown in the middle of the display, and all storage elements representing storage-related managed resources (e.g., data storage systems, storage adapters, adapter ports) are displayed on the right hand side of the network topology view.

In addition, the method embodiments of the invention determine a coupling condition of the connectivity element(s) in relation to either or both of (e.g., at least one of) the host element(s) and the storage element(s). The coupling condition is produced by detecting physical or logical couplings between host related devices, storage related devices and connectivity related devices. As an example, suppose a fiber channel port within a host bus adapter within a host computerized device in the storage area network is coupled using a fiber channel connection cable (e.g., an optical cable) to a port of a fiber channel switch (i.e., a connectivity device) within the storage area network. In addition, suppose another port of the fiber channel switch is coupled via a fiber channel connection to a port in a storage adapter within a storage array within the storage area network. The management application operating on the management workstation that is configured according to embodiments of the invention can maintain one or more element databases of managed objects representing these various entities. Using processing techniques explained herein, embodiments of the invention are able to examine or query managed object data structures within the element database(s) in order to determine existing interconnection relationships between the various managed resources within the storage area network. From these interconnections (e.g., pointers indicating links between managed resources) embodiments of the invention can determine that coupling conditions exist between, for example, the connectivity element such as a port within a switch to either a host port of a host or a storage port of a data storage system. Coupling conditions thus indicate or identify in this example that the switch is coupled to both a host and a storage system.

Embodiments of the invention further operate to display the coupling condition, for example as a graphical line or link on the display of the computerized device, between the connectivity element and either or both of the host element and the storage element to which that coupling condition relates in order to visually convey the coupling condition to a user viewing the network topology view. In other words, embodiments of the invention can determine coupling conditions between managed network resources and can then visually display or represent these coupling conditions, for example, as graphical lines drawn or otherwise rendered within the network topology view between the displayed host, connectivity and storage elements displayed within the respective display areas. Since the host display area is separated from the storage display area by the connectivity display area, this processing creates the effect of displaying data communications links between displayed elements from one display area (e.g., a host element representing a host computerized device in the host display area) to another display area (e.g., a connectivity element representing a switch in a connectivity display area). Since elements of each type (e.g., host, connectivity and storage) are maintained in respective areas, the user can quickly determine, for example, which icons correspond to host related devices, switch or connectivity device, storage devices and so forth.

Embodiments of the invention further display a hierarchical arrangement of icons associated with host elements, storage elements, and connectivity elements maintained (e.g., as element definitions) within one or more storage area network element databases. The hierarchical arrangement of icons can be separate from the host, connectivity and storage display areas (e.g., displayed to the left or right of these areas). Embodiments of the invention display the hierarchical arrangement of icons as a menu or list of the various manageable network resources that a user can select for display within the network topology view. As will be explained in more detail, the hierarchical arrangement of icons can have a top-level hierarchy of top-level manageable resource categories such as host devices, storage devices, connectivity devices, zones, groups and the like. A user is able to use an input device such as a mouse pointer to expand these top-level manageable resource categories to see various manageable resources in lower-level resource categories associated with (i.e., as children of) the expanded top-level category. As an example, the user can select the top-level host devices category and can expand this category in which case embodiments of the invention display a list of various selectable host devices that a user may choose to include within the network topology view. The user is able to individually select particular managed entities or groups of resources to be displayed in this manner. In response, embodiments of the invention operate to render such selected managed resources as elements according to the network topology view framework discussed above using the particular display areas for placement of icons representing respective managed resources.

In particular, embodiments of the invention receive, from the hierarchical arrangement of icons, a user selection of elements including the host element(s), the storage element(s) and the connectivity element(s). It is to be understood that all of such user selections need not be received from the user at the same time. In response to receiving a selection, embodiments of the invention display the user selection elements by performing the steps of displaying the host element(s), displaying the connectivity element(s) and displaying the storage element(s) in respective host, network and storage display areas of the network topology view. In this manner, the user has complete control over which particular network resources are to be presented graphically within the network topology view and the system of the invention is able to automatically align elements representing these resources in their respective display areas. This is a very powerful aspect of the invention since the user may only be interested in management of particular resources and thus embodiments of the invention need not render or present the entire network topology to the user for viewing in such cases.

Further still, since the user may select managed resources to be included or excluded from the network topology view and the embodiments of the invention always add or remove these resources from the respective display areas according to the selected resource type, the user does not have to visually hunt through the network topology view in an attempt to locate a resource that has been selected for viewing within the network topology view. Rather, since embodiments of the invention provide the respective display areas broken down into different resource types (e.g., host display area, connectivity display area, storage display area), the user will intuitively know where to look to further invoke management operations on a resource that is selected by that user to be included within the network topology view.

In addition to the aforementioned embodiments of the invention, other embodiments of the invention provide refinements and additional features based upon the aforementioned network topology view framework. As an example, a user is able to operate embodiments of the invention to create user-defined groups of managed resources and is then able to expand and collapse these groups within the network topology view. Embodiments of the invention further provide various unique group control mechanisms that allow for ease of use to expand and collapse groups and to add and remove a particular resource or resources from a particular group.

Further still, other embodiments of the invention provide automatic alignment of elements within the network topology view as a user adds or removes resources into or out of the view or when a user expands a particular resource in a view to see managed resource elements related to that particular resource. In particular, certain embodiments of the invention include a concept of parent-child relationships between elements displayed within the network topology view. As an example, consider a host computerized device that includes a number of host bus adapter devices that each contains a set of respective data communications ports. Embodiments of the invention may represent or render a host element in the host display area to represent the host computerized device as a top-level or parent element. The user may select this top level host element for expansion in order to view child elements related to this host element where and each child elements represents one of the host bus adapter cards within that host computer device. Further still, the user may decide to select one of the host bus adapter child elements in order to further expand this element within the network topology view in order to view the child port elements of the host bus adapter element that correspond to individual port devices within the host bus adapter in that host computerized device. During such user expansion operations (and collapsing operations that condense elements into their parent elements), embodiments of the invention provide automatic alignment of all of these host related devices within the host display area in order to visually convey the parent child relationships thus allowing the user to readily ascertain what child elements are child elements of which parent elements.

Other embodiments of the invention allow the display of zones elements including zone coupling conditions that exist between a number of managed resources include within a zone. A network manager may configure a zone for purposes of access control for input-output requests between hosts and certain storage systems. As an example, suppose a zone configured by a network administrator includes two host computerized devices, a switch and three storage array devices. In such a case, embodiments of the invention allow a user to select a zone set configured in this manner and in response, the system of the invention displays the zone elements within the network topology view for element definitions within an element database that identify devices associated with those elements as being part of the zone.

In addition, embodiments of the invention can further display zone coupling conditions between each displayed zone elements in a format that differentiates the zone coupling conditions from non zone coupling conditions. As an example, links in the view that couple elements in the same zone may be highlighted, may change color, or may flash or change to a different line type (e.g., bold, dotted, etc.). This allows a user to quickly determine zone configuration between host elements displayed in a host display area, connectivity elements displayed in the connectivity display area and storage elements displayed in the storage display area.

Other embodiments of the invention include a computerized device, such as a host computerized device, workstation or other computerized device configured to process all of the aforementioned method operations disclosed herein as embodiments of the invention to provide a network topology view and associated resource management operations. In such embodiments, the computerized device includes a display, a memory system, a processor and an interconnection mechanism connecting the display, the processor and the memory system. The memory system is encoded with a resource management application that when performed on the processor, produces a resource management process that includes a graphical user interface produced on the display of the computerized device. The graphical user interface allows the resource management process to perform all of the method embodiments and operations explained herein as embodiment of the invention.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides a graphical user interface including a network topology view and associated operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers can also provide the system of the invention.

It is to be understood that the system of the invention can be embodied strictly as a software program, as software and hardware, or as hardware alone. Example embodiments of the invention may be implemented within EMC's Control Center software application that provides graphical management functionality for storage area network resources and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
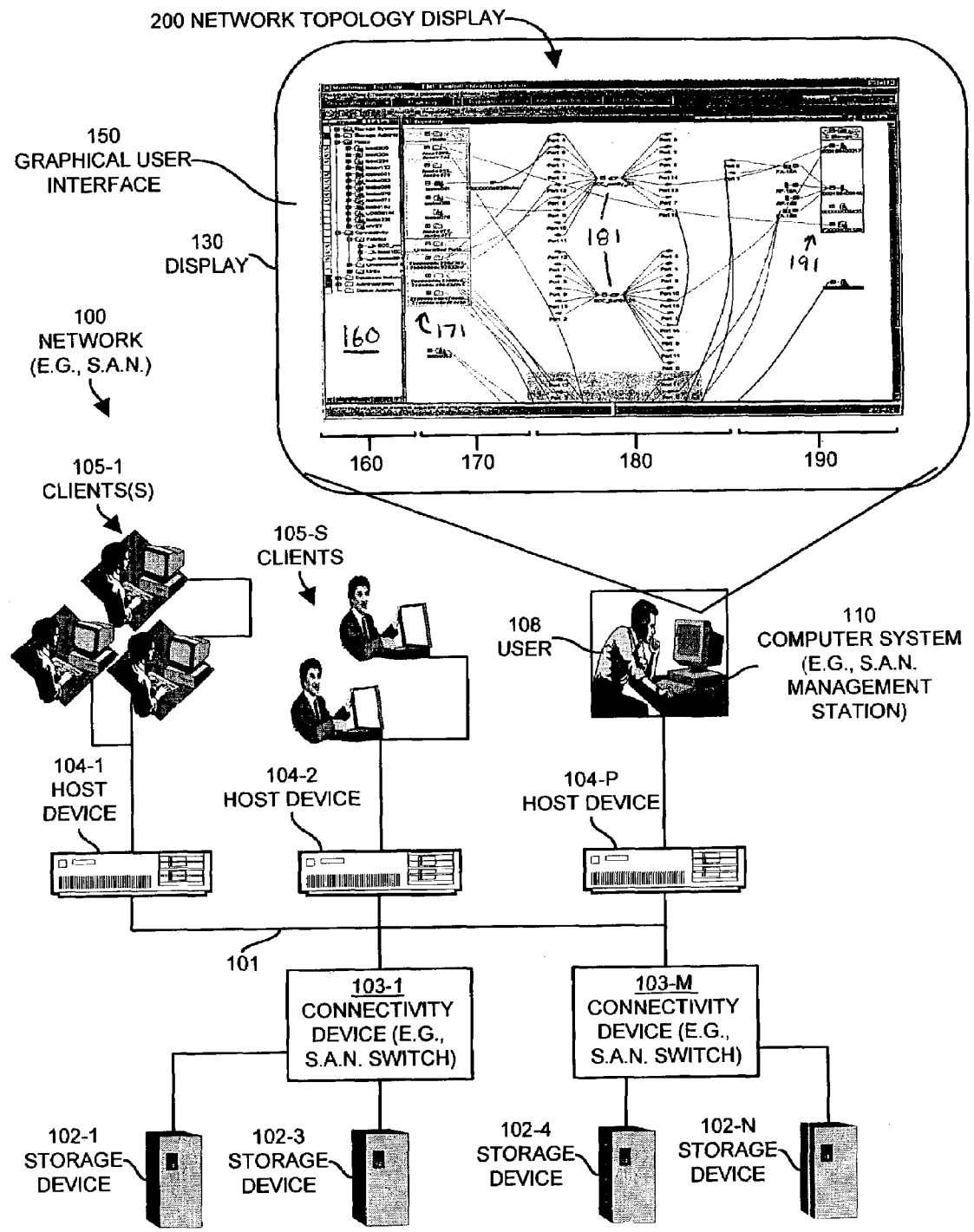
FIG. 1 illustrates an example storage area network and computing system environment including a management station computerized system configured to operate according to embodiments of the invention.

Embodiments of the present invention relate to mechanisms and techniques that provide a unique graphical user interface for visual representation and management of storage system resources, network resources, and/or other computer-related system or device resources that can be remotely managed. The mechanisms and techniques that provide the graphical user interface as described herein include resource management software applications and/or management computerized devices configured (e.g., programmed) to manage such resources in a storage area network. An example of a preferred embodiment is a computerized device such as a network manager's workstation that operates as a storage area network management station for management of software, computer, storage and/or other resources within a storage area network environment.

Resources that can be graphically managed by such an embodiment include both software resources such as application programs that operate on remote computerized devices (e.g., within data storage systems, for example), as well as remote physical devices such as servers, hosts, data storage systems, network switches, disks, database applications, software entities (e.g., logical volume managers) or other entities upon, or in which those software applications operate. In an environment such as a storage area network, such resources (software and hardware) are often quite complex and can be configured in a variety of arrangements and can be remotely managed via various protocols. A user of the system of the invention, such as a systems or network manager or administrator, can use the graphical user interface as provided by embodiments of the invention to efficiently visualize and optimally manage (e.g., monitor, configure and/or otherwise operate) such resources in this type of environment.

More specifically, embodiments of the invention provide a graphical user interface as explained herein that allows a user, for example, to visualize elements of a network within a network topology view on a display of a computerized device. Embodiments of the invention allow the user operating an input device such as a mouse that controls a pointer on the display of the computerized device to select managed network resources represented as elements within a hierarchical arrangement of element icons that represent various network elements such as host elements, storage elements and connectivity elements. Upon selection of element icons from the hierarchical selection of icons, embodiments of the invention display corresponding element icons and display the element icons according to common types in respective display areas.

As an example, storage elements are displayed in a storage display area, host elements are displayed in a host display area and connectivity elements are displayed in a connectivity display area. The connectivity display area is displayed in between the host display area and the storage display area. Embodiments of the invention can show coupling conditions as links between the elements in the display area to indicate how devices corresponding to these displayed elements are coupled within the storage area network. Using this network topology view framework, embodiments of the invention provide an intuitive view that shows interconnections between hosts devices represented by host elements to storage devices represented by storage developments. Such interconnections take place through connectivity devices such as switches represented by connectivity elements in a network display area that is displayed between the host and storage elements.

In one embodiment of the invention, host, connectivity and storage display areas are arranged in the network topology view in a linear manner such as horizontally from left to right to mimic the flow of information to and from hosts and data storage systems through switches. Thus embodiments of the invention do not necessarily attempt to model the actual physical layout or placement of devices within, for example, different lab or other facilities within an organization that operates the storage area network, but instead, display the host, connectivity and storage elements according to information flow between these elements. In addition, embodiments of the invention determine coupling conditions between the various display elements and display the coupling conditions as links on the display of the computerized device in order to visually convey the coupling conditions between devices corresponding to elements. Further details of embodiments of the invention will be described in the discussion below and in relation to the attached figures. By presenting a visual display of storage area network elements based on information flow instead of randomly or based on some geometric or geographic positioning of devices corresponding to these elements, a user is able to more intuitively identify, select and manage devices in a storage area network as compared to conventional network displays.

FIG. 1 illustrates an example of a storage area network 100 suitable for use in explaining the operation of example embodiments of the invention. The storage area network 100 includes a network medium 101 such as a high-speed data communications medium (e.g., Ethernet, optical network, or other type of network) that interconnects a plurality of components 102 through 110 and that allows the components to communicate with each other. The components or devices in this example include a variety of data storage systems 102-1 through 102-N, storage area network switches 103-1 through 103-M, host computerized devices 104-1 through 104-P, client computerized devices 105-1 through 105-S, and a computerized device 110. The computerized device 110 is configured, in this example, as a storage area network management station that is operated by a network manager or user 108 (i.e., a person responsible for managing the resources within the storage area network 100). The network management station computerized device 110 operates a resource manager 120 that performs processing and provides a network topology view in accordance with embodiments of the invention as will be explained herein. The resource manager 120 in this example may be any type of network management software application that can execute, perform or otherwise operate within the management station computerized device 110. While not shown in detail in this figure, certain other components may include one or more internal devices as well as software applications or processes that operate within or in conjunction with the illustrated components and devices in FIG. 1.

As shown towards the top of FIG. 1, and of particular interest to discussion of this invention, the management station computerized device 110 is a computerized device that includes a display 130 (e.g., a monitor or other visual display device) with which the resource manager 120 operates to display a graphical user interface 150 as explained herein. The graphical user interface 150 configured in accordance with embodiments of the invention includes a hierarchical arrangement of icons 160 and a network topology view 200. The network topology view 200 includes a host display area 170, a network display area 180 and a storage display area 190.

Generally, and as will be explained in more detail shortly, the graphical user interface 150 allows a user 108 of the computerized device 110 to select one or more element icons 161 from a hierarchical arrangement of icons 160. In response, embodiments of the invention display corresponding elements 171, 181 and 191 within the respective host, network and storage display areas 170, 180 and 190 of the network topology view 200. Connectivity elements 181 are displayed in the network display area 180 that is graphically positioned between the host display area 170 and the storage display area 190. Due to this layout or framework of the graphical user interface 150, embodiments of the invention provide automatic and user intuitive categorization or grouping of similar devices within similar respective display areas associated with devices of the same type. As an example, all host related devices, whether they be hosts, adapters, or ports are shown as host elements 171 within the host display area 170. Because of this, during the application of management functionality to particular devices corresponding to particular elements within the network topology view 200, users are able to quickly ascertain which elements are of interest to a user and are able to quickly identify and select those elements representing respective devices within the storage area network.

Also as will be explained, the graphical user interface 150 provided by embodiments of the invention provides easy application of unique operations related to management functionality such as element grouping, element zoning visualization, element expansion and contraction, element link identification, and element neighbor identification. The network topology view framework and placement of the respective display areas as illustrated within the graphical user interface 150 enhances such features provided by embodiments of the invention. Further details of these features and other aspects of embodiments of the invention will be explained with reference to the remaining figures.

Figure 2:
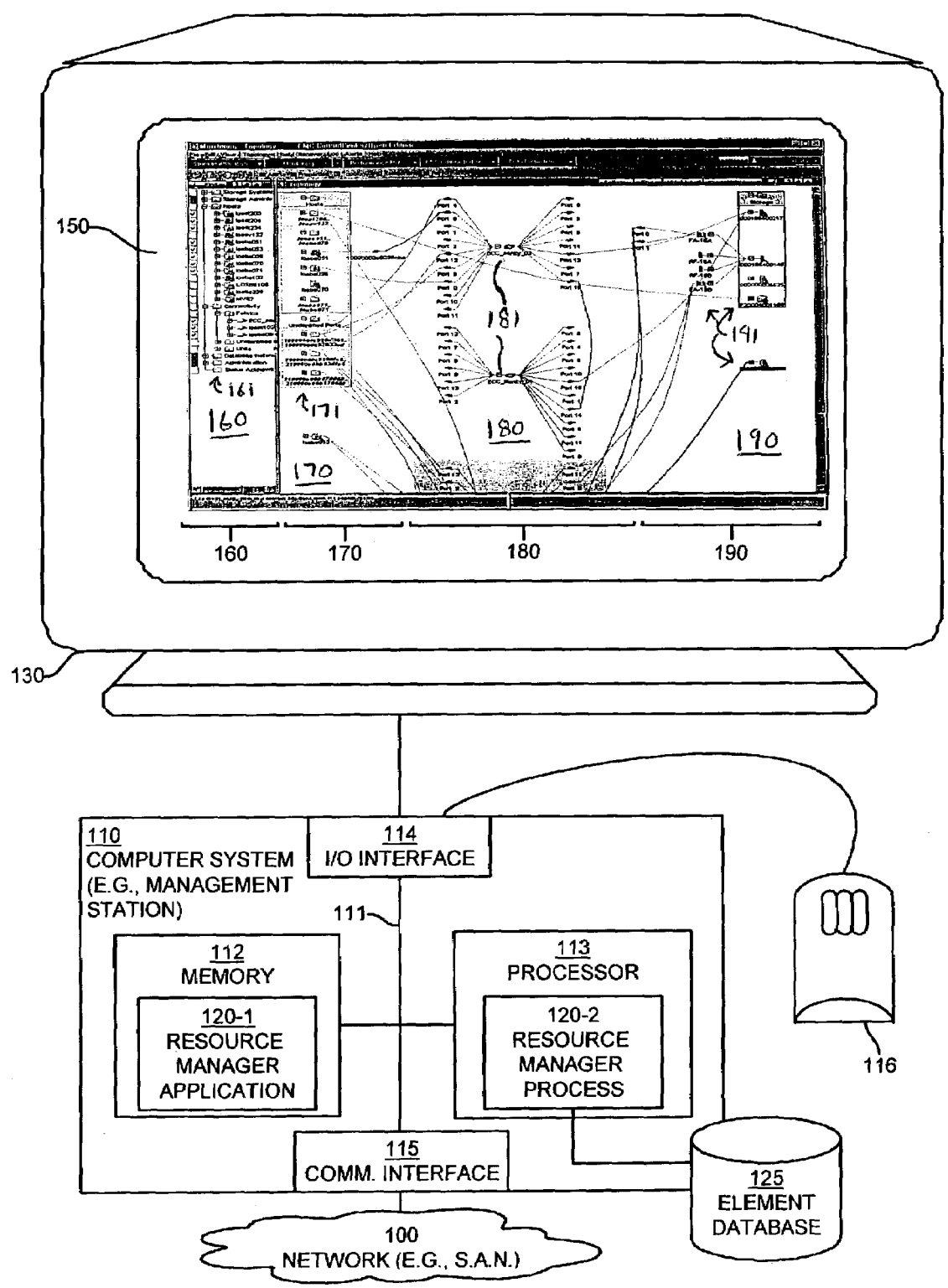
FIG. 2 illustrates an example architecture of the management station computerized system from FIG. 1 including an example of a graphical user interface configured according to embodiments of the invention.

FIG. 2 illustrates example architecture of the computerized device 110, such as a storage area network management station, configured according to embodiments of the invention. The computerized device 110 may be any type of computerized device such as a personal computer, workstation, portable computing device, console, network terminal or the like. The computerized device 110 in this example includes an interconnection mechanism 111 that couples a memory system 112, a processor 113, an input/output interface 114 and a communications interface 115. The input/output interface 114 allows peripheral devices to be connected to the computerized device 110. In this example, coupled to the input output interface 114 and operating as part of the computerized device 10, are a peripheral input device 116 such as a mouse and/or a keyboard and a peripheral output device such as the computer display 130 upon which the computerized device 110 can render or otherwise display visual images such as the graphical user interface 150 for viewing by the user 108 (FIG. 1). The communications interface 115 allows the computerized device 110 to communicate with devices (i.e., resources) that operate within the network 100.

The memory system 112 is encoded with a resource manager application 120-1. The resource manager application 120-1 represents software code such as data and/or logic instructions (e.g., stored in the memory or on another computer readable medium such as a disk) that embody the processing functionality of embodiments of the invention. The processor 113 can access the memory system 112 via the interconnection mechanism 111 in order to launch, run, execute, interpret or otherwise perform the logic instructions of the resource manager application 120-1 in order to produce the resource manager process 120-2. In other words, the resource manager process 120-2 represents one or more portions of the resource manager application 120-1 (or the entire application 120-1) performing within or upon the processor 113 in the computerized device 110. It is to be understood that the resource manager 120 operating within the computerized device 110 illustrated in FIG. 1 is represented in FIG. 2 by either one or both of the resource manager application 120-1 and/or the resource manager process 120-2. For purposes of the discussion of the operation of embodiments of the invention, general reference will be made to the resource manager 120 as performing the various steps and operations to carry out the features of embodiments of the invention.

Is to be understood that embodiments of the invention include the resource manager application 120-1 (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments of the invention can provide the resource manager application 120-1 operating within the processor 113 as the resource manager process 120-2. While not shown in this example, those skilled in the art will understand that the computerized device 110 may include other processes and/or software and hardware components, such as an operating system, which have been left out of this illustration for ease of description of the invention. In addition, the display 130 need not be coupled directly to the computerized device. In such cases, the resource manager 120 can execute on one computerized device and can be remotely accessed, for example, over a network in which case the graphical user interface 150 is displayed locally to the user, while the resource manager process 120 is executed remotely.

The resource manager process 120-2 is capable of accessing information within and element database 125. The element database 125 contains element definitions (e.g, database records, tables or other data structures) corresponding to various manageable elements (e.g., devices) operating within the storage area network 100. Essentially, element definitions within the element database 125 are data structures or managed objects that contain the data and information related to host devices, connectivity devices and storage devices and associated components (e.g., portrayals internal ports, cards, etc.) and software systems that can be remotely managed. The resource manager process 120-2 may operate in conjunction with database management software to manage the element database 125. As an example, there may be a separate record or data structure in the element database 125 for each individual manageable entity. By way of example, for a host computerized device including an adapter have two fiber channel ports, there can be element definitions for the host computer, for the adapter and for each of the fiber channel ports. The host might have an operating system and there can be an element definition for the operating system as well.

Directing attention now to the graphical user interface 150, when the resource manager process 120-2 operates within the computerized device 110, the user 108 (FIG. 1) can use the input device 116 to control an input selector such as a mouse pointer to perform selection and manipulation of elements corresponding to devices and other manageable entities within the storage area network 100 by making such selections within the graphical user interface 150 according to the embodiments of the invention. The processor 113 performs the resource manager process 120-2 to carry out this processing as explained herein. Specific operation of embodiments of the invention will be discussed next with respect to a flow chart of processing steps in FIG. 3 and with reference to the graphical user interface 150 including the network topology view 100 illustrated as provided by the resource manager 120 as briefly discussed above with respect to FIGS. 1 and 2.

Figure 3:
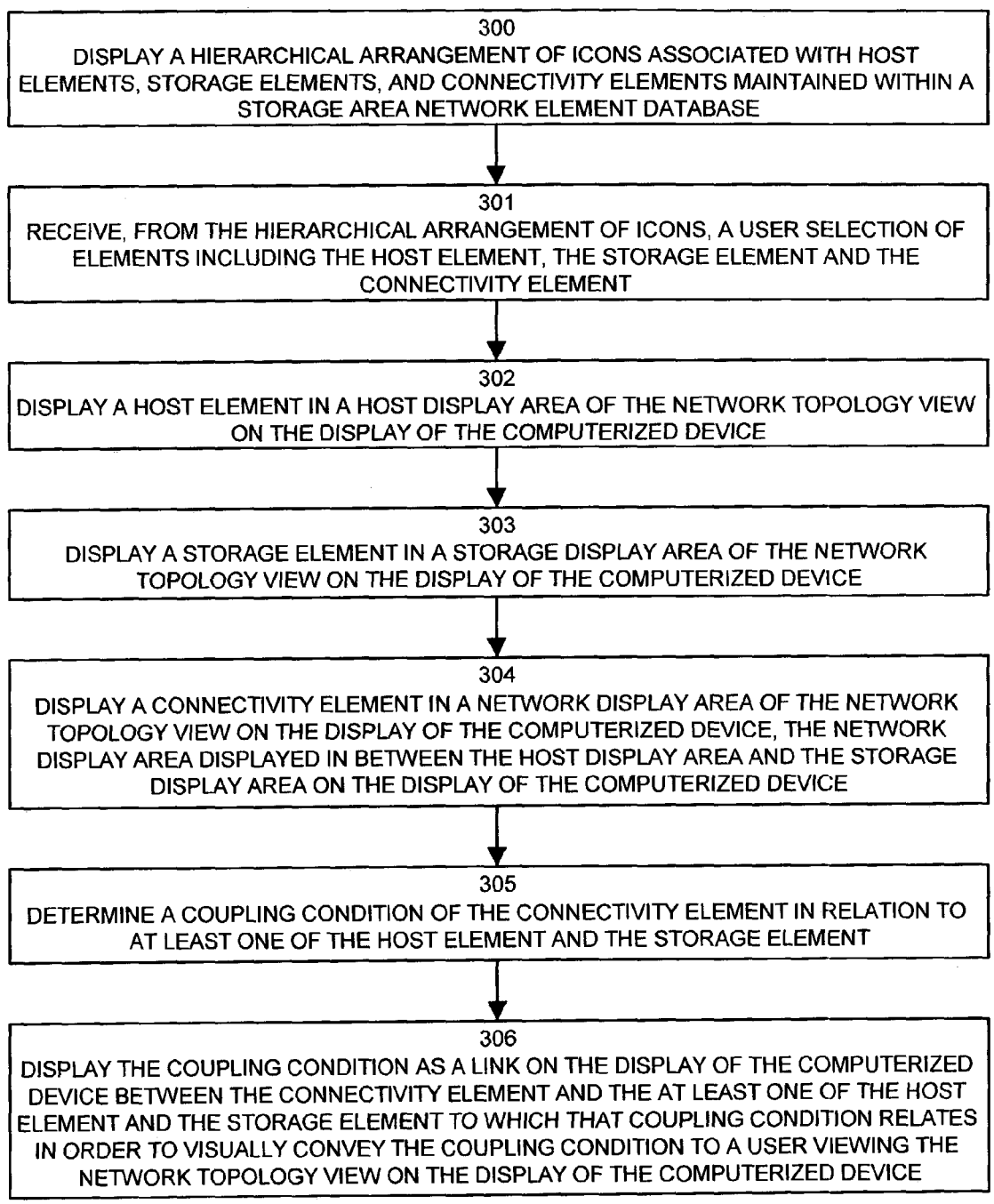
FIG. 3 is a flow chart of processing steps that show the general operation of a resource manager process providing a graphical user interface configured according to embodiments of the invention.

FIG. 3 is a flow chart of processing steps performed by a resource manager 120 configured in accordance with one example embodiment of the invention to allow a user 108 of the management station computerized device 110 to visualize elements of the network such as a storage area network 100 on a display 130 of the computerized device 110.

In step 300, the resource manager 120 displays a hierarchical arrangement of icons 160 associated with host elements, storage elements and connectivity elements maintained within a storage area network element database 125. As illustrated in the graphical user interface 150 in FIG. 2, the resource manager 120 displays the hierarchical arrangement of icons 160 on the left-hand side of the graphical user interface 150 in this example. Generally, the hierarchical arrangement of icons 160 is a collection of expandable element icons that may be expanded and collapsed in a tree-like manner when a user double-clicks on a selection or when the user operates the "+" and "−" symbols adjacent to each icon selection. As an example, a user may select a top-level element category such as host devices for expansion in order to view a list of individual host elements representing specific host devices 104 or groups of host devices that are operating within the storage area network 100. Each top-level or parent category of elements such as host devices, connectivity devices, storage devices, zone sets and the like may be expanded to expose or display the list of related elements below that top-level category in the managed resource or managed object hierarchy expressed by the hierarchical arrangement of icons 160.

In step 301, the resource manager 120 receives, from the hierarchical arrangement of icons 160, a user selection of elements including a host element, a storage element and a connectivity element. Note that the user 108 may select one or more of each of such elements, or may select only some of such elements and not others. Generally, the resource manager 120 provides a selection mechanism within the hierarchical arrangement of icons 160 such as double clicking followed by element highlighting that allows the user 108 to individually select or deselect and identify any specific selected element icons corresponding to specific devices of interest within the storage area network 100.

Next, in step 302 the resource manager 120 displays a host element 171 (e.g., corresponding to the user selections) in a host display area 170 of the network topology view 200 on the display 130 of the computerized device 110. In other words, in this step the resource manager 120 graphically displays a host element 171 as an icon or other graphical symbol within the host display area 170. Note that if the user 108 selected many host icons in the hierarchy 160, the resource manager 120 can display each selection as a separate host element, or may combine host elements into an arranged group of host elements represented in the display area 170 by a single arranged group host element icon 171. Arrangement of hosts into a prearranged group element icon may be based, for example, on a property common to some or all selected hosts, such as being on the same subnet or in the same zone or having similar host names and so forth.

In step 303 the resource manager 120 displays a storage element 181 in the storage display area 180 of the network topology view 200 on the display 130 of the computerized device 110. Just as in step 302, the resource manager 120 thus draws or otherwise renders a storage element icon 181 within the designated storage display area 190 within the network topology view 200.

In a similar manner, in step 304, the resource manager displays a connectivity element 181 within the network display area 180 of the network topology view 200 on the display 130 of the computerized device 110. According to embodiments of the invention, the network display area 180 is displayed or disposed in between the host display area 170 and the storage display area 190 on the display 130 of the computerized device 110. By placing connectivity elements 181 which are icons that represent, for example, storage area network switches 103 (FIG. 1) or other data communications devices in between host elements 171 and storage elements 191 that represent respective host and storage devices 104 and 102 (FIG. 1), the network topology view 200 configured according to embodiments of the invention allows a user 108 viewing the graphical user interface 150 to visually perceive respective groups of related devices as represented by their respective elements. In addition, the display arrangement provided by embodiments of the invention conveys a correct information flow model between hosts and storage systems in a storage area network. As an example, all host elements are displayed within the host display area to avoid the user from having to visually scan other areas of the network topology display 100 when searching for a particular host element corresponding to a host device that the user 108 desires to manage.

Next, in step 305, the resource manager 120 determines a coupling condition of the connectivity element 181 in relation to either one or both of (i.e., at least one of) the host element 171 and the storage element 191 displayed within the network topology display 200. As an example, the resource manager 120 might determine the coupling condition in one embodiment of the invention by querying the network element database 125 to determine if the host element 171 (i.e., its corresponding host element managed object data definition within this database) has a coupling associated with the connectivity element 181 as represented within the element database 125 by a connectivity element managed object data structure definition (not specifically shown in this example). In addition, the resource manager 120 might query the network element database 125 to determine if the storage element 191 has a coupling associated with the connectivity element 181, each of which are represented by element definitions (e.g., table or other data structures, not specifically shown) within the network element database 125. Since each managed object resource within the storage area network 100 has at least one corresponding element definition within the element database 125, when the resource manager 120 displays various host, connectivity and storage elements 171, 181 and 191 on the network topology display 200, the element definitions within the element database 125 can contain references to each other if these devices are physically coupled to one another within the storage area network 100.

In step 306, the resource manager 120 displays the coupling condition(s) as link(s) 205 on the display 130 of the computerized device between the connectivity element 181 and either one or both of the host element 171 and the storage element 191 to which that coupling condition relates in order to visually convey the coupling condition(s) to a user 108 viewing the network topology view 200 on the display of the computerized device 110. In other words, in step 306, the resource manager 120 displays a graphical line 205 representing a link between host elements 171 in the host display area 170 to connectivity elements 181 displayed within the network display area 180. Likewise, if a link or coupling condition exists between a storage device 102 in a connectivity device 103 in the storage area network 100, and storage and connectivity elements 191 and 181 are visually displayed on the network topology view of 200, then the resource manager 120 displays these interconnections as link lines 205 (i.e., coupling conditions) rendered between the graphical icons within the network topology view 200 in order to visually conveyed to the user that the devices corresponding to these element icons are coupled to each other for example, by interface cables or another communications medium within the storage area network. Thus, if the host element 171 has a coupling associated with the connectivity element 181, the resource manager 120 draws a visual coupling 205 between the host element 171 and the connectivity element 181. Likewise, if the storage element 191 has a coupling associated with the connectivity element 181 (i.e., as expressed by their respective element definitions within the element database 125), the resource manager 120 draws or otherwise renders a visual coupling 205 between the storage element 191 and a connectivity element 181.

In this manner, embodiments of the invention provide a linear or horizontal representation of the storage area network to the user 108 that conveys information flow. This linear representation that in this example extends from left to right allows the user 108 to quickly identify related resources within the storage area network 100. Specific illustrations of other advantageous feature of the invention will be further explained in detail herein.

Figure 4:
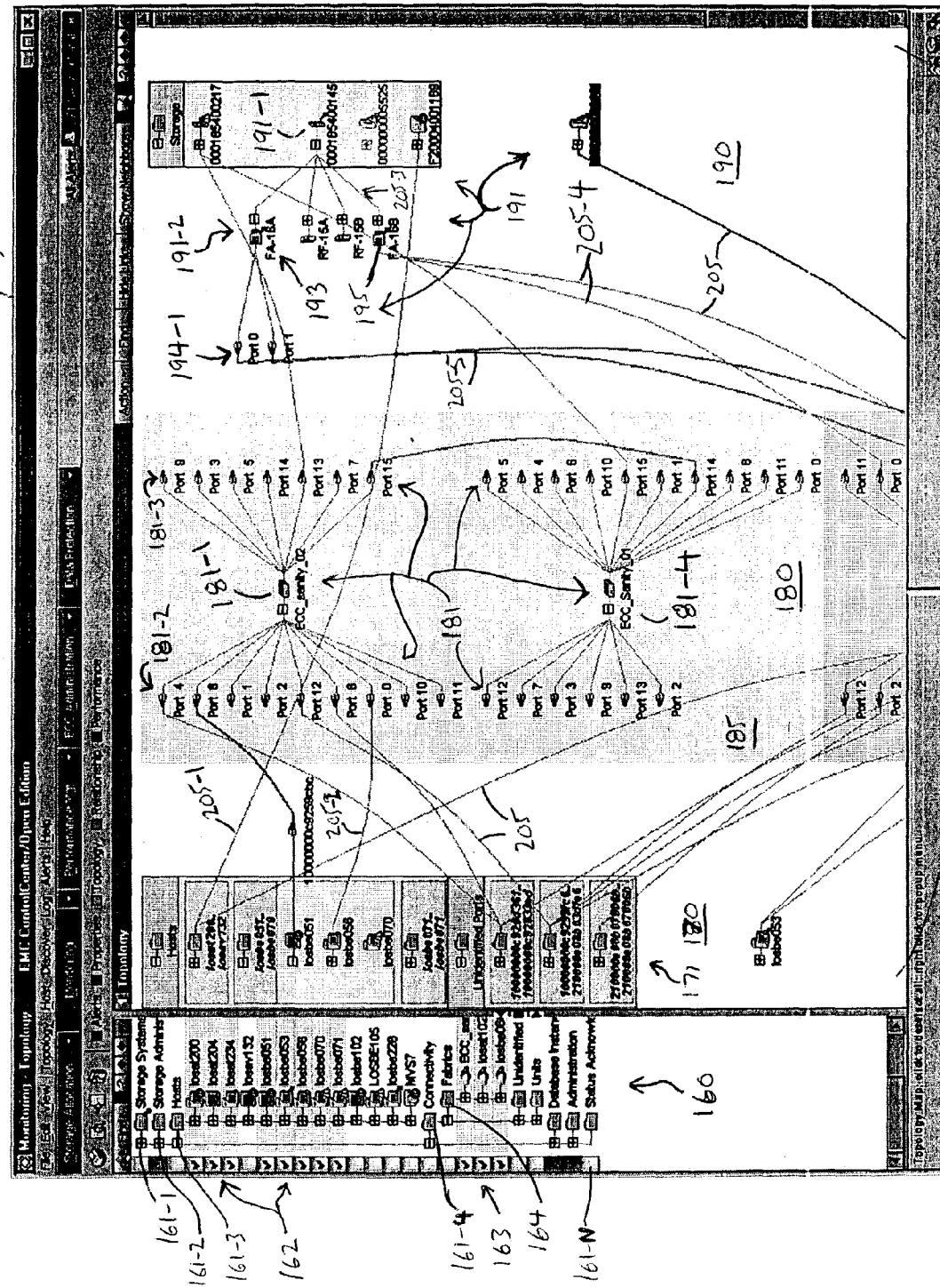
FIG. 4 shows an example of a graphical user interface configured according to one embodiment of the invention.

FIG. 4 illustrates a more detailed example of the contents of the graphical user interface 150 provided by embodiments of the invention after selection of a number of user selected elements within a hierarchical arrangement of icons 160 and display of those corresponding elements within the network topology view 200. The illustration in FIG. 4 is an actual screen shot of operation of a storage area network resource manager application 120-1 operating as resource manager process 120-2 that provides the graphical user interface 150 and which is configured according to embodiments of the invention.

As illustrated in the screen shot in FIG. 4, the hierarchical arrangement of icons 160 includes a number of top-level user selectable element icons 161-1 through 161-N. In this example, the top or parent level user selectable element icon 161-3 corresponds to host devices operating within a storage area network. In this example, a user has expanded the host element icon 161-3 in order to display a list of individual host element icons indented beneath the top-level host devices element icon 161-3. In addition, the user using an input device 116 (FIG. 2) has selected (162) individual respective host element icons corresponding to specific host devices for display within the network topology view 200. Likewise, the user has also expanded the hierarchy of icons existing below the top-level connectivity element icon 161-4 in order to visually expose for display a connectivity fabric icon 164 which is a child element icon of the parent or top-level connectivity element icon 161-4. The user 108 has also selected (163) certain connectivity devices listed beneath the expanded fabric element category icon 164 for display of these specific connectivity devices corresponding to these selected element icons within the network topology view 200.

Based on these user selections 162 and 163 from the hierarchical arrangement of icons 160, the resource manager 120 operating within the computerized device 110 (e.g., FIG. 2) displays respective host elements 171 within the host display area 170 corresponding to each selected 162 host device selected beneath the host element category icon 161-3. The resource manager 120 has also displayed respective storage elements 191 within the storage display area 190. The storage elements 191 that the resource manager displays within the storage display area 190 correspond to respective user selected storage elements that the user 108 may have selected beneath the hierarchy of storage devices under the top-level storage system category element icon 161-1 within the hierarchical arrangement of icons 160 (this top-level storage system element 161-1 appearing in this example in a collapsed view). Likewise, the resource manager 120 has displayed, in the network display area 180, connectivity elements 181 which correspond to respective selected 163 connectivity elements within the hierarchical arrangement of icons 160.

Further still, this example illustration of the network topology view 200 illustrates how embodiments of the invention can display coupling conditions as a number of links 205 (examples of which are enumerated in FIG. 4) between the various elements displayed within the network topology view 200. In other words, the graphical lines or links 205 extending between particular host elements 171 displayed in the host display area 170 to particular switch port elements 181 (another example of a connectivity element, as will be explained) represent connectivity conditions between port devices corresponding to the port elements and host devices corresponding to the respective displayed host elements 171. Similar links 205 are shown in this example extending between storage elements 191 in the storage display area 190 and other port connectivity elements 181 (e.g., switch ports) within the network display area 180.

It is to be understood that the coupling conditions that the resource manager 120 displays on the network topology view 200 as links 205 may define a logical coupling between devices. That is, the coupling conditions can define a logical coupling representing at least one actual physical coupling existing between, for example, a connectivity devices (e.g., a fiber Channel switch) associated with the connectivity element 181 and a host device or storage device associated with the corresponding host element 171 or storage element 191 displayed on the network topology view 200. As an example, the link 205-1 enumerated within the host display area 170 extends between a host element 171 representing an actual host device 104 (FIG. 1) and a storage element 191 in the storage display area 190 that represents an actual storage device 102 (FIG. 1). This link 205-1 represents a logical coupling between the host device and storage device corresponding to these respective linked elements. The actual physical coupling conditions that exist between this host device and this storage device may exist, for example, for one or more connectivity devices not illustrated or selected for view by the user in this particular network topology view 200.

To further illustrate the example between logical coupling and physical couplings, another enumerated link 205-2 in FIG. 4 illustrates an example of a physical coupling between a particular host element 171 and a port connectivity element 181 of a particular connectivity device such as a switch within the storage area network. That is, the link 205-2 represents an actual physical cable connection between a host and a port within a storage area network switch. Embodiments of the invention are able to distinguish between these two types of links, for example, by providing differentiated lines such as lines of different color, size or composition (e.g., solid versus dotted) to represent physical or logical links to contrast these different types of links and corresponding logical or physical coupling conditions.

In this example then, the connectivity elements 181 represent at least one switch, the host elements 171 represent at least one host computer, and storage elements 191 represent at least one storage device operating in a storage area network. Furthermore, the coupling conditions displayed as links 205 on the network topology view 200 represent at least one physical or logical coupling between at least one host computer and at least one switch and between the switch and at least one storage device operating in the storage area network 100.

The graphical user interface 150 shown in FIG. 4 further illustrates other features provided by embodiments of the invention. In particular, the illustrated network topology view 200 in FIG. 4 conveys how a user can expand a parent element to show child elements of the parent element. As an example, the resource manager 120 providing the network topology view 200 can receive a user expansion selection of the elements 171, 181 for 191 displayed on the network topology view 200. In response to a user expansion selection of an element 171, 181 or 191, the resource manager 120 can perform element expansion processing to display child elements associated with the element for which the user expansion selection was received. The child elements are positioned within the display area of the network topology view 200 associated with the selected parent element.

As an example, directing attention to the network display area 180 in FIG. 4, the connectivity element 181-1 represents a storage area network switch operating in the storage area network represented by the network topology view 200. In this example, the user 108 has previously applied a user expansion selection to the switch connectivity element 181-1 in order to perform element expansion processing to display sets of child connectivity elements 181-2 and 181-3 which in this example are the individual switch ports or data communications interfaces existing and operating within the switch device represented by the switch connectivity element 181-1. In other words, in this example, the child connectivity elements 181-2 (on the left-hand side of the parent switch connectivity element 181-1) represent interface devices associated with the switch device in the center that corresponds to the parent switch connectivity element 181-1.

As another example, storage device element 191-1 represents a particular storage device operating within the storage area network represented by the network topology view 200. The user has selected this top-level storage element 191-1 for user expansion causing the resource manager 120 to perform element expansion processing to display child storage elements 191-2 (front-end storage adapters in this example). Likewise, the user in this example is also selected child storage element 193 (one of the four adapters visible) for further user expansion and in response to resource manager 120 has performed element expansion processing to display the specific child port elements 194-1 associated with a particular front-end adapter storage device corresponding to the storage element 193. In other words, this example illustrates how a user can expand a top-level element to show child elements representing devices operating within or under control of the device corresponding to be expanded top-level element. Devices corresponding to these child elements may in turn have operate manageable entities and thus a user may further expand these child elements corresponding to these child devices to show other child devices (i.e., grandchild elements of the parent element).

Figure 5:
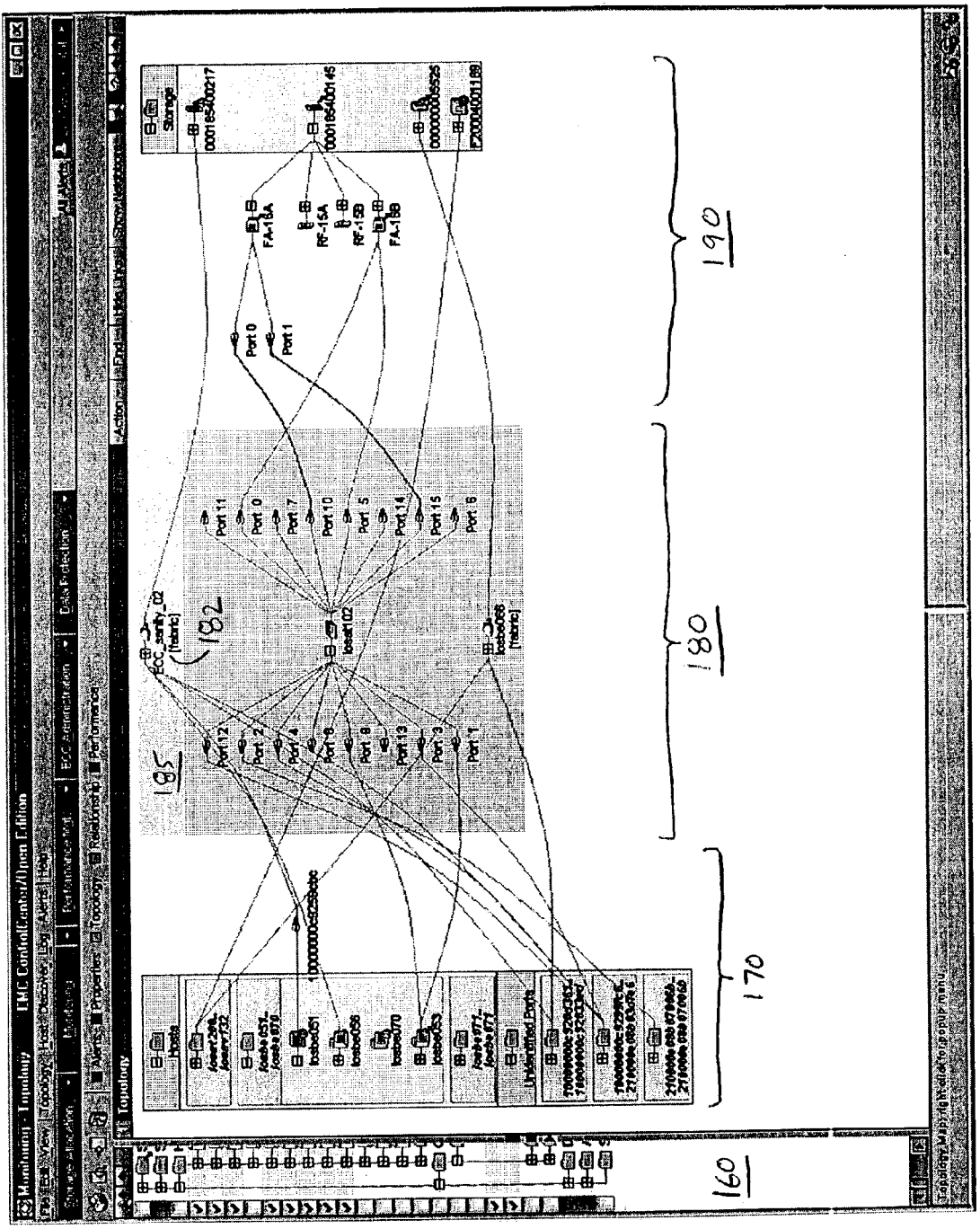
FIG. 5 shows another example of a graphical user interface including a network topology view configured according to one embodiment of the invention.

FIG. 5 illustrates another example of the network topology view 200. In the example illustrated in FIG. 5, a connectivity element 182 displayed within the network display area 180 represents an unexpanded connectivity element that represents a switch fabric. The switch fabric connectivity element 182 represents the two storage area network switch devices corresponding to respective connectivity elements 181-1 and 181-4 from FIG. 4. In other words, if the user 108 is viewing the network topology view 200 illustrated in FIG. 4 and desires to collapse a group of related elements, which in this example is a group of elements including connectivity elements 181-1 and 181-4, the resulting display appears as illustrated in FIG. 5. The single top-level connectivity element 182, generally referred to in this example a group element, represents both connectivity elements (i.e., both switches in the group) 181-1 and 181-4 from FIG. 4. This example thus illustrates the concept of groupings of devices as provided by embodiments of the invention.

Returning attention briefly back to FIG. 4, embodiments of the invention operate to convey to the user 108 the fact that switch devices related to connectivity elements 181-1 and 181-4 are related to each other by displaying a background region 185 having a common attribute, which in this case is a common color background shading region. In other words, the shaded background 185 in FIG. 4 which surrounds the connectivity elements 181-1 and 181-4 and their associated displayed child connectivity elements (i.e., ports) indicates to the user 108 that all of these elements (and hence their associated devices within the storage area network) are associated to each other in a defined group of devices. Perhaps the user has grouped these devices, as will be explained, since they are all related in a management sense to each other (e.g., all are for use in maintaining and serving data for a particular department in a company).

When the user 108 collapses the representation of these elements as illustrated in FIG. 4 into the resulting representation illustrated in FIG. 5, a single connectivity element 182 replaces all parent and child elements from FIG. 4. This single connectivity element 182 has the same color shaded background 185 within the connectivity display area 180 that is the same color as the background 185 illustrated FIG. 4 to convey to the user that this is the same group that is now displayed in its collapsed version or condensed form. Additional details and examples of grouping and ungrouping elements in the network topology view 200 that represent devices in a storage area network will be provided shortly. Prior to this discussion however, a flow chart of processing steps will be explained that illustrates processing involved to expand and contract parent and child elements within the network topology view 200 in accordance with embodiments of the invention.

Figure 6:
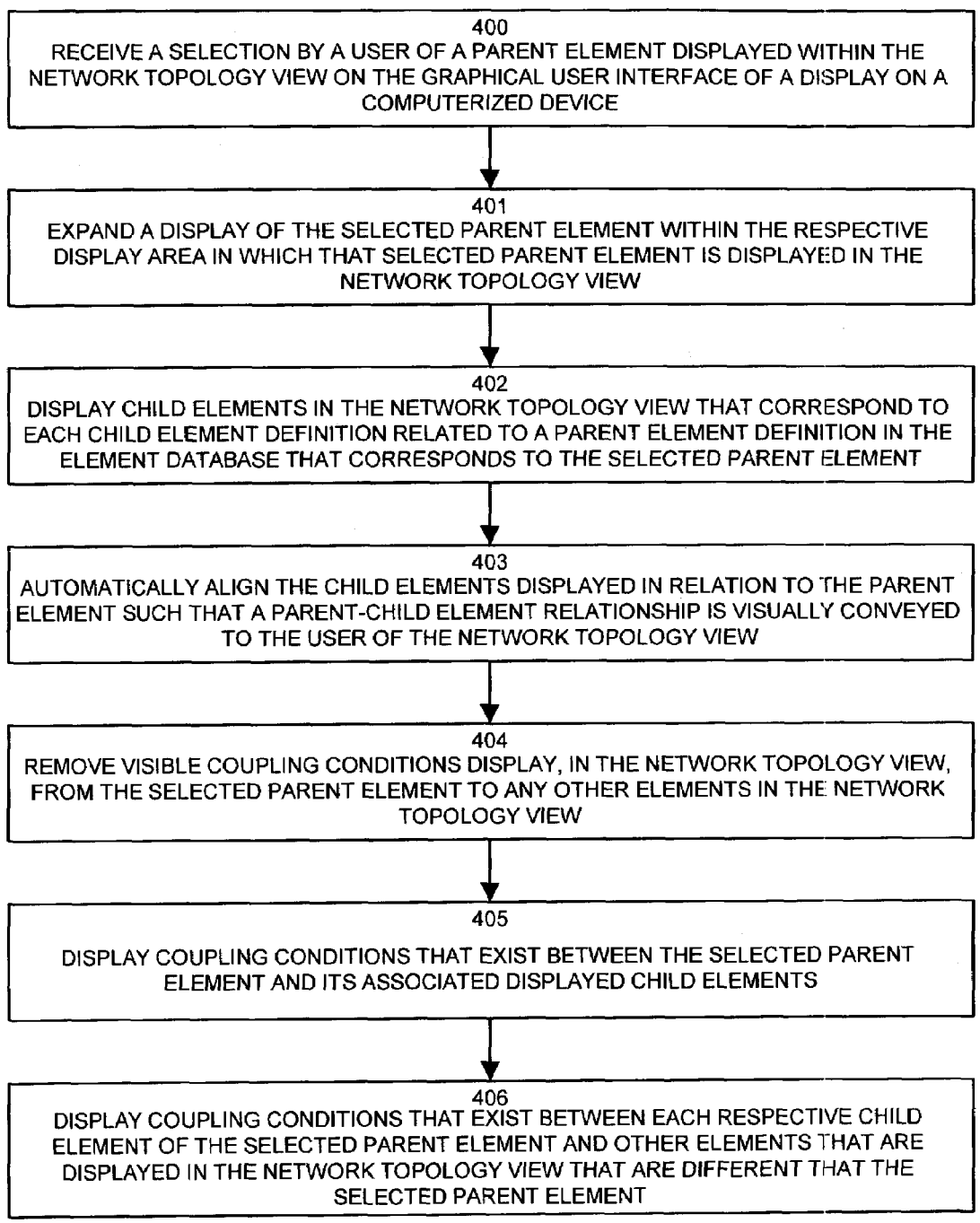
FIG. 6 is a flow chart of processing steps that a resource manager performs to expand in elements within the network topology view according to one example embodiment of the invention.

FIG. 6 is a flow chart of processing steps performed by a resource manager 120 configured in accordance with embodiments of the invention to perform expansion of a parent element in order to show children elements of that parent element. It is to be understood that processing steps performed according to the opposite operation are contemplated as an alternative embodiment of the invention to perform a collapse operation to condense a representation of multiple child objects into a single parent element within the network topology view 200. For this example, assume that a user 108 is initially viewing the network topology view 200 as illustrated in FIG. 4, but that this view 200 does not currently display child elements 191-2 and 194-1 associated with the storage device element 191-1. As such, in this example the user 108 desires to expand the storage element 191-1 in order to view child elements representing child devices such as storage system front-end adapters and associated ports related to this storage device parent element 191-1.

In step 400, the resource manager 120 receives a selection by a user 108 of a parent element (e.g., an icon) displayed within the network topology view 200 on the graphical user interface 150 of a display 130 on a computerized device 110. Based on the aforementioned example, suppose the user 108 is viewing the network topology view 200 in FIG. 4 and selects the parent group storage device element 191-1 in order to expand this top-level or parent storage device element to view its direct child descendant elements (e.g., adapter devices operating within the storage device corresponding to the parent storage device element 191-1).

Next, in step 401, the resource manager 120 expands a display of the selected parent element 191-1 within the respective display area (i.e., the storage display area 190 in this example) in which that selected parent element 191-1 is displayed in the network topology view 200. In addition, according to this embodiment of the invention, the expanded display of that parent element 191-1 includes a display of respective child elements, generally referenced by numeral 191-2, that correspond to each of the plurality of actual child devices represented by (e.g., operating within) the parent element 191-1 (i.e., when that parent element is in its unexpanded or collapsed form it represents the storage device and all of the devices operating therein). Accordingly, a user viewing the network topology view 200 can visually identify the child elements 191-2 that correspond to the specific actual child devices (e.g., front-end adapters) associated with a parent device (i.e., a storage device) represented by the selected parent element 191-1. Steps 402 through 405 illustrate processing details performed according to one embodiment of the invention to expand the display of the selected parent element (i.e., to perform the general processing of step 401).

In step 402 the resource manager 120 displays child elements in the network topology view that correspond to each child element definition related to a parent element definition in the element database 125 that corresponds to the selected parent element 191-1 (i.e., selected for expansion in step 400). In other words, after the resource manager 120 in step 400 receives a selection of a parent element 191-1 for expansion, the resource manager 120 displays child elements 191-2 corresponding to each child device associated with the parent device in the storage area network. Embodiments of the invention can query the element database 125 to determine the relationship between parent and child devices and thus may display the appropriate child elements corresponding to the child devices by querying the element database 125 for access to the parent element definition (e.g., a database record) corresponding to the selected parent element. Using this as a starting point, embodiments of the invention may retrieve other managed object records or definitions within the database that the parent element definition references and that identify specific child element definitions corresponding to child devices that hierarchically relate below (i.e., devices that operate within a parent device, such as an adapter in a storage system) the parent device element definition. In this example then, the element database 125 contains child element definitions (i.e., managed object data structures) for each of the adapter devices operating within the storage device corresponding to the parent element 191-1.

Next, in step 403 the resource manager 120 automatically aligns the child elements (e.g., 191-2) displayed in relation to the parent element 191-1 such that a parent-child element relationship is visually conveyed to the user of the network topology view 200. In this manner, this embodiment of the invention displays all child elements for a parent element within the display area 190 of the network topology view 200 that is associated with the parent element 191-1. In other words, the newly displayed child elements 191-2 are of the same type (e.g., storage device type) as the parent element 191-1 and thus the resource manager displays these newly displayed child elements 191-2 within the same storage display area 190 as the parent element. In this manner, as a user expands or collapses elements within display areas 170, 180 and 190 of the network topology view 200, embodiments of the invention ensure that child elements are displayed within predetermined or known locations in relation to the parent elements. These know locations are the respective display areas and a user can be sure that elements displayed in these areas are of a certain type. Accordingly, embodiments of the invention make it significantly easier than conventional systems for a user 108 of the graphical user interface 150 to locate managed resources within the network topology view 200 during expansion and contraction of elements representing devices within the storage area network.

As another example, if a user expands a host element corresponding to a host computerized device to display network interface card or port elements corresponding to child port devices operating within this particular selected host device, the host ports will be displayed as child port elements in relation to the parent host device elements within the host display area 170. By automatically aligning the elements corresponding to the child devices in relation to the parent device elements and by forcing the child elements corresponding to the child devices to be displayed within the respective display areas also associated with the parent elements of the parent device within the network topology view 200, embodiments of the invention significantly reduce user frustration in locating managed resources and in determining how one resource relates to another.

Next, in step 404 the resource manager removes all visible coupling conditions displayed, in the network topology view 200, from the selected parent element 191-1 to any other elements in the network topology view 200. In other words, in step 404, since the resource manager 120 has just previously (i.e., in step 403) displayed child elements of the parent element), the formerly displayed links directly to that parent element 191-1 in the network topology view 200 are now removed.

In step 405 the resource manager 120 displays coupling conditions that exist between the selected parent element and its associated displayed child elements. Accordingly, as illustrated in FIG. 4, the resource manager 120 displays the links 205-3 representing the coupling conditions between the parent element 191-1 and its respectively displayed child elements 191-2 (i.e., representing the interface between the storage device and its respective front-end adapters that correspond to the elements). This step thus creates links from the parent element to its newly displayed child elements.

In step 406, the resource manager 120 then displays coupling conditions (i.e., links) that exist between each respective child element of the selected parent element and other elements that are displayed in the network topology view 200 that are different than the selected parent element. This step thus causes the resource manager 120 to create and display graphical links from the newly displayed child elements to other devices coupled to those child elements (or for devices coupled to elements related below that child that are not currently displayed). As in example with respect to FIG. 4, the resource manager 120 displays the links 205-4 extending from the front-end adapter child element 195 to illustrate and convey to the user how a front-end adapter device corresponding to this element 195 couples to particular switch ports of the switch device having a displayed element within the network topology view 200 that is not currently visible (i.e., that is off the screen below the visually displayable area) in example in FIG. 4.

From the aforementioned processing steps shown in FIG. 6, embodiments of the invention allow the resource manager 120 to visually expand a user selected parent element to display its related child elements. In addition, links formerly extending to the parent element are removed and are replaced by links that extend to that parent's child elements. Note that in example in FIG. 4, this process has been repeated an additional time for the child element 193 corresponding to a specific front-end adapter device of the storage device corresponding to parent element 191-1, such that the resource manager 120 has displayed additional child elements 194-1 that correspond to individual ports of the front-end adapter device corresponding to the storage element 193. Likewise, this processing has also replaced links that formerly extended directly to the front-end adapter storage element 193 with links 205-5 that extend to the particular child port elements 194-1 that are now rendered for viewing by the user 108.

The aforementioned processing thus allows a user 108 to drill down in context into the particular elements within a storage area network topology view 200 to finer and finer levels of granularity in order to ascertain the particular interconnections of components and devices operating within the storage area network rendered within the network topology view 200. Embodiments of the invention thus provide an extremely powerful solution for a network manager user 108 to determine precisely how devices within a storage area network are interconnected.

Figure 7:
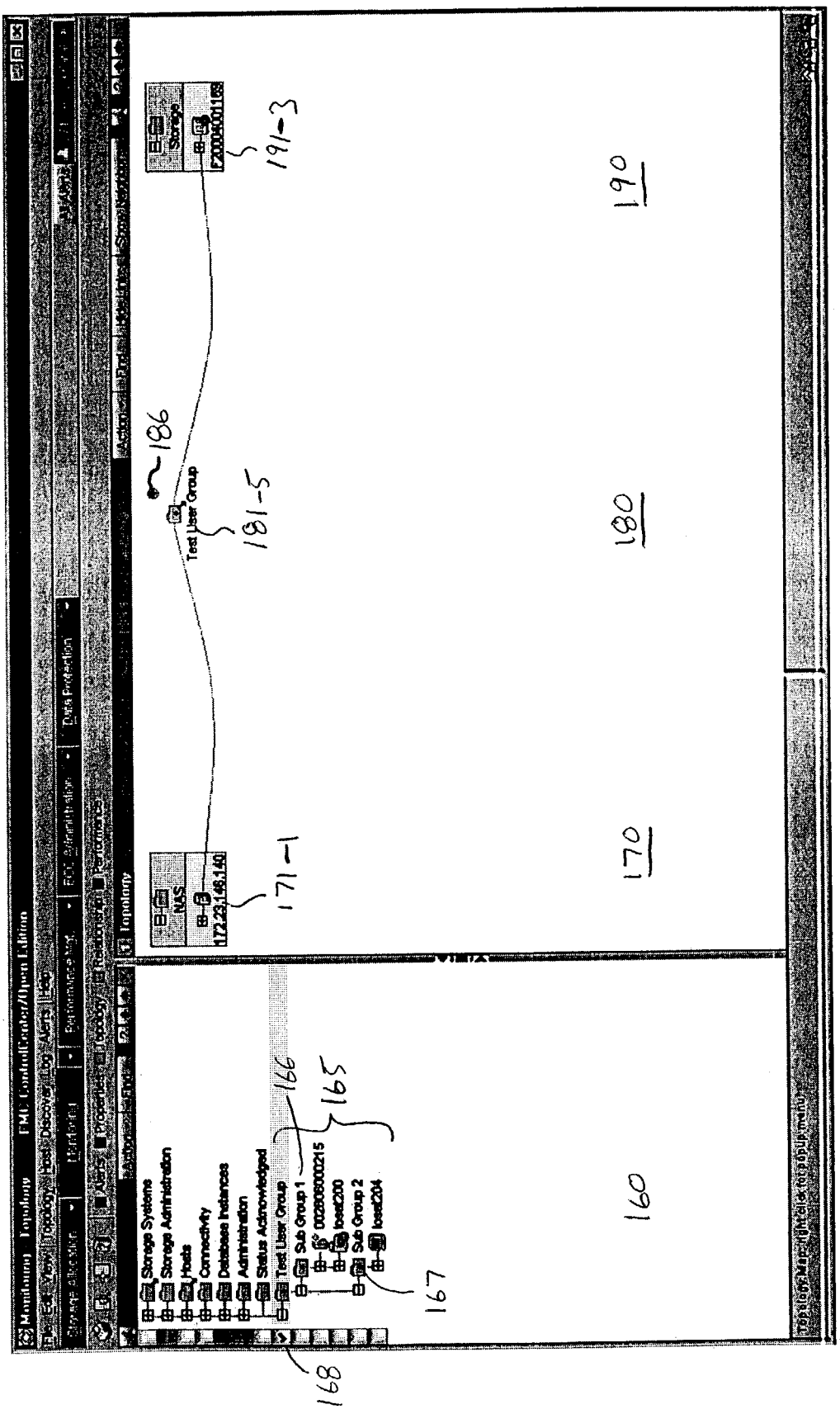
FIG. 7 shows another example of the graphical user interface including a network topology view containing a group element in accordance with one embodiment of the invention.
Figure 8:
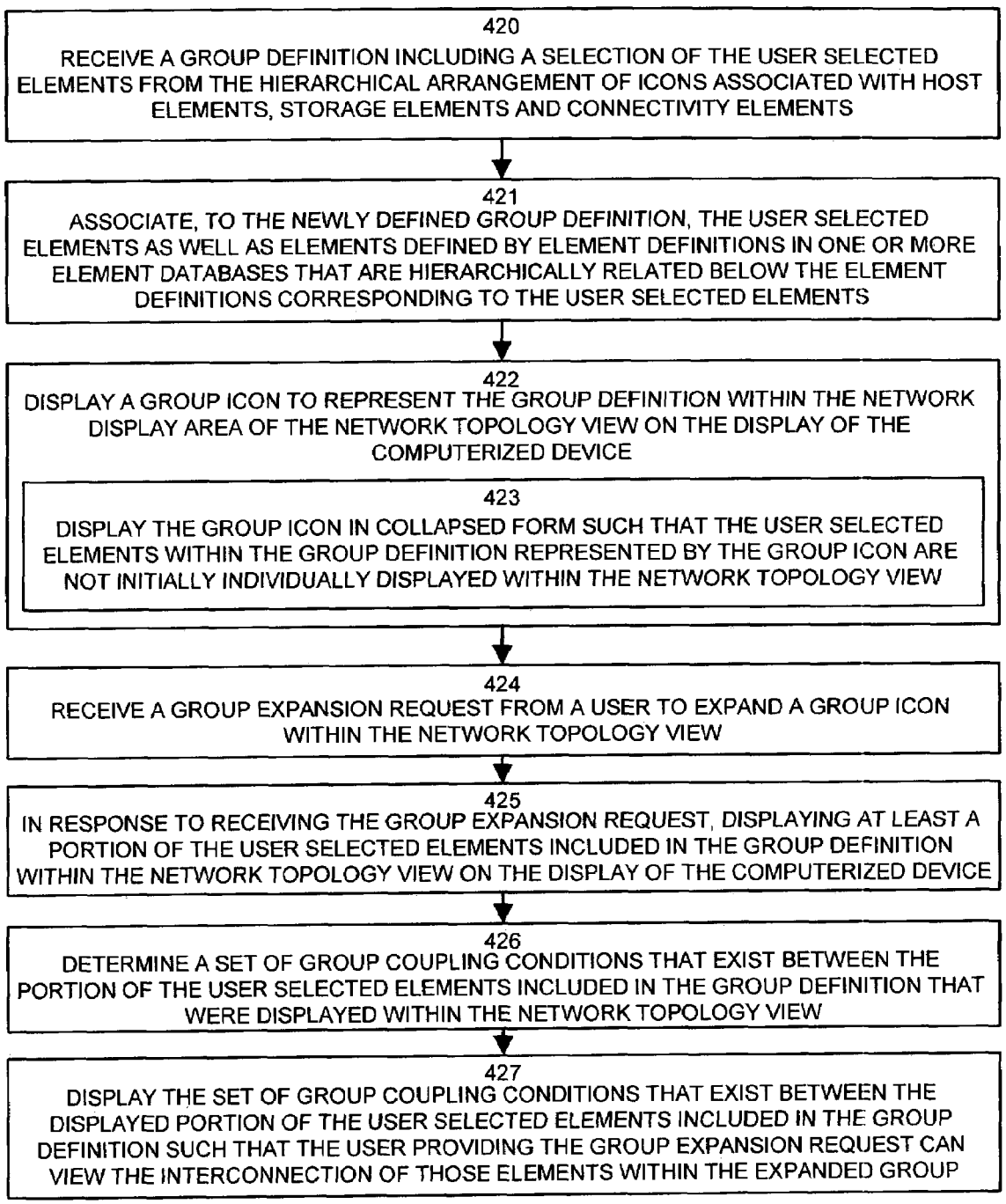
FIG. 8 is a flow chart of processing steps that a resource manager performs to allow the user to group elements within the network topology view and expand the group elements according to one embodiment of the invention.
Figure 9:
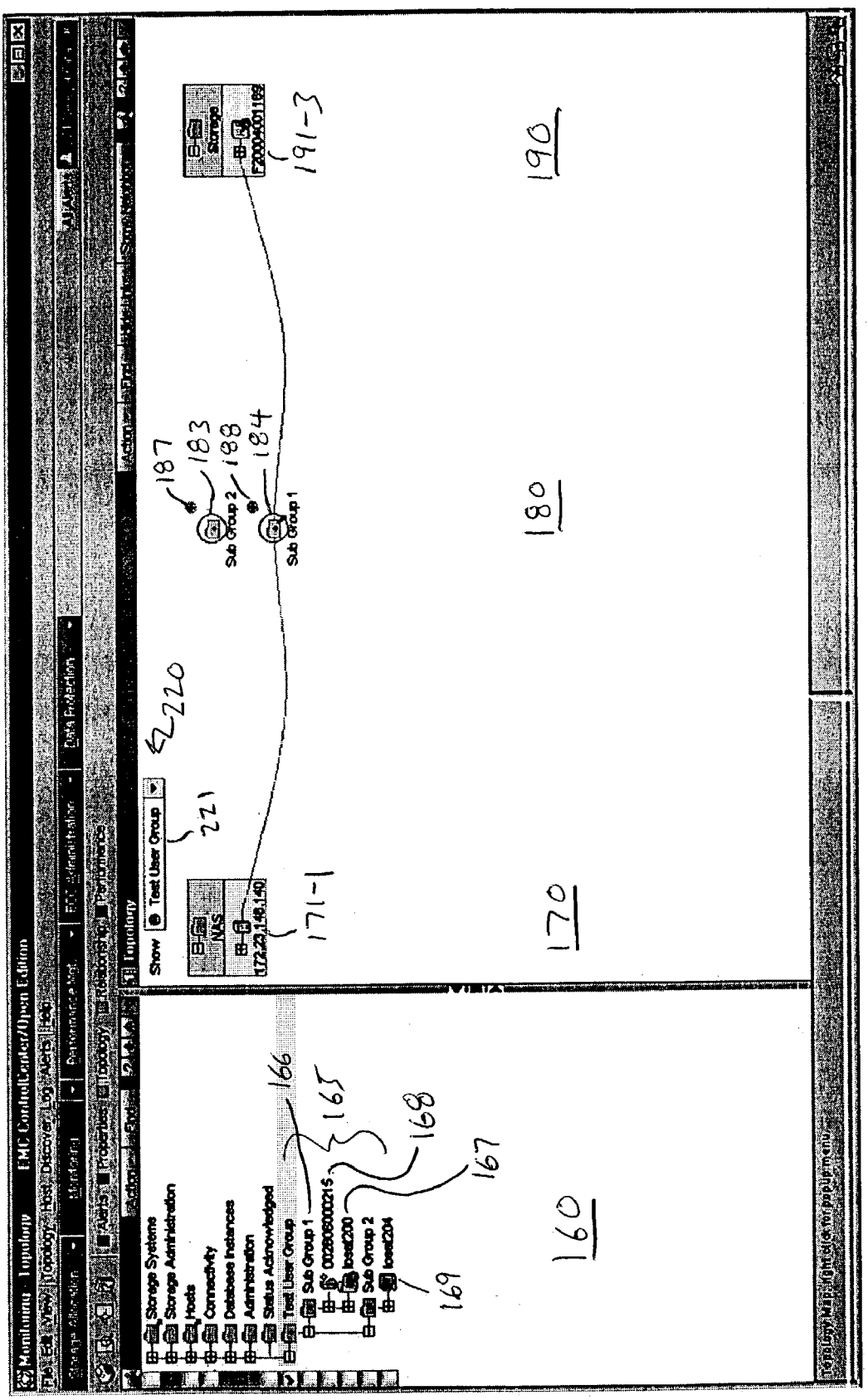
FIG. 9 shows another example of a graphical user interface including a network topology view in which a group element has been expanded in accordance with one embodiment of the invention.

Embodiments of the invention support a user's ability to group elements together within the network topology view. FIGS. 7 through 9 illustrates this concept. In particular, as illustrated in FIG. 7, in this example of the network topology view 200, the user 108 has operated an input device 116 (FIG. 2) to define within the hierarchical arrangement of icons 160 a test user group 165 that includes two subgroups 166 in 167. As will be explained in more detail shortly, a user is able to drag and drop element icons within the hierarchical arrangement of icons into sub-groups (i.e., group folders) in order to add or combine elements corresponding to storage area network devices into a single group so that the devices within a group are associated to one another. Reasons for creating such group associations may be, for example, to apply management commands to all devices in a single group, without have to apply the same command to each device in the group individually. As in example, using embodiments of the invention, the user is able to expand, for example, the host devices element category within the hierarchical arrangement of icons 160 and is able to drag and drop selected icons representing certain host computerized devices into a group of hosts that may be collectively managed as one entity. In the example illustrated FIG. 7, the user has selected 168 the test user group 165 for display the network topology view 200 and thus a group element 181-5 appears centered within the network display area 180. The resource manager 120 displays the group element 181-5 as a group icon in a collapsed form such that the individual user selected elements (e.g., hosts or other devices) within the group definition represented by the group 165 are not individually displayed within the network topology view 200. Note that the resource manager 120 displays a collapsed top-level group element is initially displayed in the network display area 180, even though this group element may include associations to host and storage devices.

FIG. 8 is a flow chart of processing steps performed by a resource manager 120 configured in accordance with embodiments of the invention in order to receive, from the hierarchical arrangement of icons 160, a selection of host elements, storage elements and connectivity elements in order to create or define a user defined group and to display this group in the network topology view 200.

In step 420, the resource manager 120 receives a group definition 165 including a selection of user selected elements from the hierarchical arrangement of icons 160 associated with host elements, storage elements and connectivity elements. That is, in step 420 the user can defined a group definition 165 by choosing host element icons, connectivity element icons and storage element icons (and possibly other icons, depending upon the user's preference) to be included within the group definition by, for example, dragging and dropping particular host, switch and storage device element icons (i.e., icons that represent these devices) within either the hierarchical arrangement of icons or from the network topology view and by dropping these icons into the user defined group top-level parent folder in the hierarchical arrangement of icons 160.

Next, in step 421, the resource manager 120 associates, to the newly defined group definition (i.e., the selected top-level folder indicated by the checkbox selection 168 in FIG. 7) the user selected elements as well as elements defined by element definitions in one or more element databases 125 that are hierarchically related below the element definitions corresponding to the user selected elements. In other words, the host elements correspond to a host device that includes or that operates a plurality of individual data communications port devices that each have corresponding element definitions within the element database 125. When the user associates a host element into a user-defined group, child elements definitions corresponding to the port devices and other managed entities operating within a host are also associated into the user-defined group. In this manner, embodiments of the invention make it easy for user to include many different manageable entities or resources within user-defined group. User-defined groups can allow user, for example, to apply management commands universally to elements defined within the group such as, for example, including those elements within the particular zone configuration within the storage area network 100.

After steps 420 and 421 are complete, the user has defined a user-defined group containing an association of user-selected elements corresponding to various host devices, connectivity devices and/or storage devices. It is to be understood that more or less elements may be included within a group and thus a group may include, for example, just host devices or just storage devices or just connectivity devices or any combination thereof. Other managed entities in a storage area network can be included in a group as well, such as database elements, or specific software entities operating within hosts, such as logical volume manager software programs.

Next, in step 422, the resource manager 120 displays a group icon 181-5 (FIG. 7) to represent the group definition 165 within the network display area 180 of the network topology view 200 on the display 130 of the computerized device 110.

In sub step 423, the resource manager displays the group icon (e.g., 181-5) in collapsed form such that the user selected elements within the group definition 165 represented by the group icon 181-5 are not initially individually displayed within the network topology view 200. Accordingly, in this embodiment of the invention when the user initially defines a new top-level or parent group element icon 181-5, the resource manager 120 initially displays it in collapsed form as a top-level element.

After embodiments of the invention operate as explained above to allow user to create and display a top-level group element icon (steps 420 through 423 in FIG. 8), embodiments of the invention further allow the user to expand and collapse the top-level group element icon as shown in steps 424 through 427. Prior to discussion of these processing steps in FIG. 8, a brief introduction to group expansion mechanisms provided by embodiments of the invention will be covered with respect to a discussion of FIGS. 9 and 10.

FIG. 9 illustrates an example of expanding the top-level group element icon 181-5 in FIG. 7 to display child elements such as device elements operating within hosts, switches or storage devices or group elements corresponding to sub-groups defined within the top-level group element icon. Directing attention to FIG. 9, the user has provided a group expansion request using the group expansion mechanism 186 illustrated in FIG. 7 in order to cause the resource manager 120 to display the user defined sub-elements of this group, which in this example are sub-group element icons 183 and 184. The group expansion mechanism 186 shown in FIG. 7 thus allows the user to provide the group expansion request (e.g., by clicking this group expansion mechanism) in which case the resource manager 110 displays the view as shown in FIG. 9. Note that each sub-group element icon 183 and 184 also contains a respective group expansion mechanism 187 and 188 that indicates to the user that these are also group icons which may be further expanded to view child elements defined within these sub-groups 183 and 184. The group expansion mechanisms 187 and 188 are an example of a group view control mechanism provided by embodiments of this invention. It is to be understood that the network topology view 200 shows what the user has selected from the arrangement of icons 160, and thus if the user, as an example, only selects hosts and storage elements, for example, then the view 200 may only contain host elements linked to storage elements using coupling condition links that represent logical links, since connectivity devices are not shown (since they are not selected by the user) through which such actual physical coupling actually exist (in most network implementations). Thus a logical coupling shown in topology view might not always resemble an actual physical connection underneath, as there may be other devices that for a physical path of coupling between devices that the logical coupling collectively represents.

Figure 10:
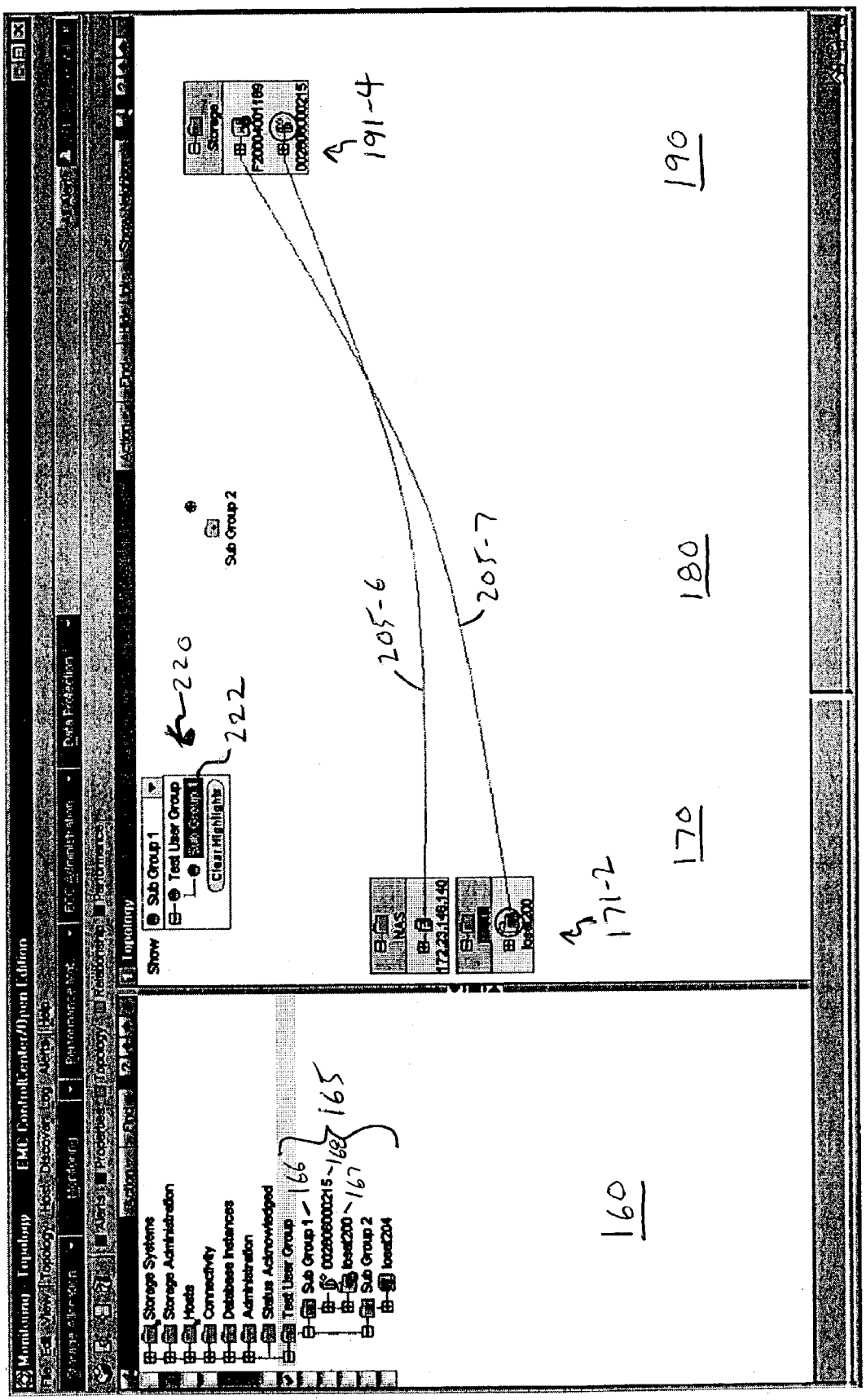
FIG. 10 shows another example of the graphical user interface including a network topology view in which a group element has been further expanded in accordance with one embodiment of the invention.

FIG. 10 is an example of the network topology view 200 according to another embodiment of the invention. The resource manager 120 displays the network topology view 200 in FIG. 10 after the user 108 provides, as input, a group expansion request to the group element icon 184 shown in the network topology view 200 in FIG. 9. In particular, as shown in FIG. 10, the user 108 has expanded the sub-group element icon 184 which causes the resource manager 120 to display all of the user selected elements within the sub group as well as connectivity conditions as a series of links between elements. Specifically, the resource manager 120 s displayed a number of host elements 171-2 which directly interconnect the links 205-6 and 205-7 in to the storage elements 191-4. In other words, when the user operates a group expansion mechanism 188 in order to expand the group element icon 184, the resource manager 120 in operates to display, in this example, the individual host elements and storage elements that the user has defined within the group definition 165 within the hierarchical arrangement of icons 160.

Note that in the example in FIG. 10, the user did not include or select any connectivity elements (e.g., switches) within the user defined group definition 165. Accordingly, when the user expands the group element icon 184 corresponding to sub-group one 166, since this sub-group 166 in the group definition 165 only contains a host element 167 and a storage element 168, then only a corresponding host element 171-2 and corresponding storage device element 191-4 are shown within the network topology view 200. The connectivity conditions displayed as links 205-6 and 205-7 in the network topology view 200 in FIG. 10 may represent logical links since there are no connectivity elements representing a connectivity device in between the coupled host and storage elements. This is because, in this example, the user did not add any connectivity elements into the group definition 165. Had the user 108 done so, embodiments of the invention would have displayed a connectivity element that interconnected the coupling condition linking the host elements 171-2 and storage elements 191-4.

Returning attention now back to the flow chart of processing steps shown in FIG. 8, processing steps 424 through 427 will be explained to illustrate the aforementioned operations discussed above with respect to expansion of a group element icon in the example networked topology views 200 shown in FIGS. 7, 9 and 10.

In step 424 the resource manager 120 receives a group expansion request from a user to expand a group icon (e.g., icon 184 in FIG. 9) within the network topology view 220. This processing may involve the user operating a group view control mechanism 186 (FIG. 7) or 220 in FIGS. 9 and 10, as will be explained, to indicate to the resource manager 120 that the user wants to expand a group icon to see its member elements.

Next, in step 425, in response to receiving the group expansion request (i.e., in response to step 424), the resource manager 120 displays at least a portion of the user selected elements (e.g., host elements, connectivity elements and/or storage elements) included in the group definition 165 within the network topology view 200 on the display 130 of the computerized device 110. Each element is displayed in a respective display area 170, 180 or 190 associated with an element type (e.g., host, connectivity, storage) associated with that element (i.e., as defined in the element definition for that element within the group definition 165). In other words, upon receipt of a group expansion request from a user 108, the resource manager 120 displays the elements that are hierarchically related one level below that group element within the group definition 165 upon the network topology view 200 and disposes or places each of these elements within the proper display areas 170, 180 and 190 such that the user 108 can quickly identify the different types of elements within the expanded group definition without having to visually scan the entire network topology view 200. In one embodiment of the invention, the resource manager can differentiate the display of the elements in the group, such as via a highlight box around such elements icons or by displaying such icons in a different color, as flashing icons, as bold or dotted lines, or by using any other visual or graphical technique to indicate which elements in the view 200 belong to the group just expanded by the user.

Next, in step 426 the resource manager 120 determines a set of group coupling conditions that exist between the portion of the user selected elements included in the group definition that were displayed (in step 425) within the network topology view 200. In other words, if a user expands a sub-group element 184, as in the example illustrated between FIGS. 9 and 10, embodiments of the invention determine any coupling conditions that exist for any of the new elements that were displayed as a result of the expansion of the group icons. This processing can involve querying the element database 125 to follow pointer or other references form one element definition data structure to other element data structure of other elements displayed in the network topology view 200 to determine how a particular element should be shown as coupled to other elements.

In step 427 the resource manager 120 displays (e.g., as links 205-6 and 205-7) the set of group coupling conditions that exist between the displayed portion of the user selected elements included in the group definition such that the user providing the group expansion request can view the interconnection of those elements within the expanded group. In this manner, once the user decides to expand a group element icon, such as group element icon 184 in FIG. 9, embodiments of the invention display the elements contained or defined by the user within that group element icon and then also display coupling conditions as links 205 within the network topology view 200 to illustrate connectivity existing between these newly displayed elements.

At this point, attention is directed briefly back to FIG. 9 in which the network topology view 200 further includes a group view control mechanism 220. When the resource manager 120 displays grouped elements in the network topology view 200, the group view control mechanism 220 allows the user to expand and/or contract the grouped elements to see different hierarchical levels of the elements in the group. When the user initially creates the group definition 165, the network topology view appears as illustrated in FIG. 7 and the group expansion mechanism 186 (another version of a group view control mechanism) visually indicates, as a "+" sign, to the user that this is a top-level group that has not yet been expanded to show its child elements. After expanding the group element icon 181-5 (via user activation of the group expansion mechanism 186) so that the network topology view 200 appears as illustrated in FIG. 9, the resource manager 120 further displays the group view control mechanism 220 as a series of one or more pull-down group level menus within the network topology display 200.

Generally, the group view control mechanism 220 provides the user with the ability to control group expansion and collapse operations associated with the elements included in the group definition associated with the group icon 181-5 by pulling down a menu that the group view control mechanism 220 provides. Each choice in the menu corresponds to a different level or layer of group expansion. As illustrated FIG. 9, the group view control mechanism 220 indicates that the currently displayed child group element icons 183 and 184 are child icons to a top or parent level group called the test user group as labeled 221 within the group view control mechanism 220 menu. If the user for example were to select the group view control mechanism label 221 corresponding to a higher level in the hierarchy if elements within the group definition 165, the resource manager 120 collapses the child group element icons 183 and 184 and returns the network topology view to an appearance as illustrated in FIG. 7. In other words, the user 108 is able to use the group view control mechanism 220 to make group hierarchy level selections from the menu in order to condense or expand elements levels, and thus control how much detail regarding elements within a group are to be shown in the network topology view 220 associated with particular group definitions.

Returning attention again to FIG. 10, since the network topology view 200 as previously explained includes a fully expanded sub-group icon (i.e., sub-group element icon 184 which is expanded to show all of its child elements within this sub-group in the network topology view 200 in the example in FIG. 10), the resource manager 120 automatically adjusts the group view control mechanism 220 to include a reference 222 (i.e., a new menu choice for the user) to this fully expanded sub-group. In other words, as the user causes the network topology view 220 to change from the view shown in FIG. 9 to the view shown in FIG. 10 by expanding the sub-group icon 184, the resource manager 120 not only displays the elements within the sub-group in expanded form within the network topology view 200 but also updates the group view control mechanism 220 to include a reference 222 to the sub-group. The user is able to select this reference 222 in the menu in order to identify and collapse elements within this sub-group that are shown in the network topology view 200 in order to return the network topology view 200 to an appearance as shown in FIG. 9.

Accordingly, the group view control mechanisms 220 (a list of menu choices of different group levels), and 186, 187 and 188 (expansion icons for particular group elements icons) provided by embodiments of the invention allows the user to expand and collapse groups from lower to higher levels and vice versa. If the user decides to fully expand a particular group icon (e.g., 184) to view all of the elements included in the group definition associated with that group icon, the group view control mechanism 220 provided by embodiments of the invention allows the user to go backwards and collapse or condense those elements back into a single group icon or to a set of group icons for a middle level in the group element hierarchy. Accordingly, the appearance of the group view control mechanism 220 within the network topology view 200 indicates to the user that certain elements displayed within the network topology view 200 are associated with a group and are shown in expanded form, whereas the appearance of the group expansion mechanism (another form of group view control mechanism) 186, 187 and 188 indicates to the user 108 that an icon may be expanded to see group elements associated with that icon. In one embodiment, as long as a group is displayed on the network topology view 200 the resource manager 120 includes a group view control mechanism 220 to control group expansion and contraction of its associated elements.

Figure 11A:
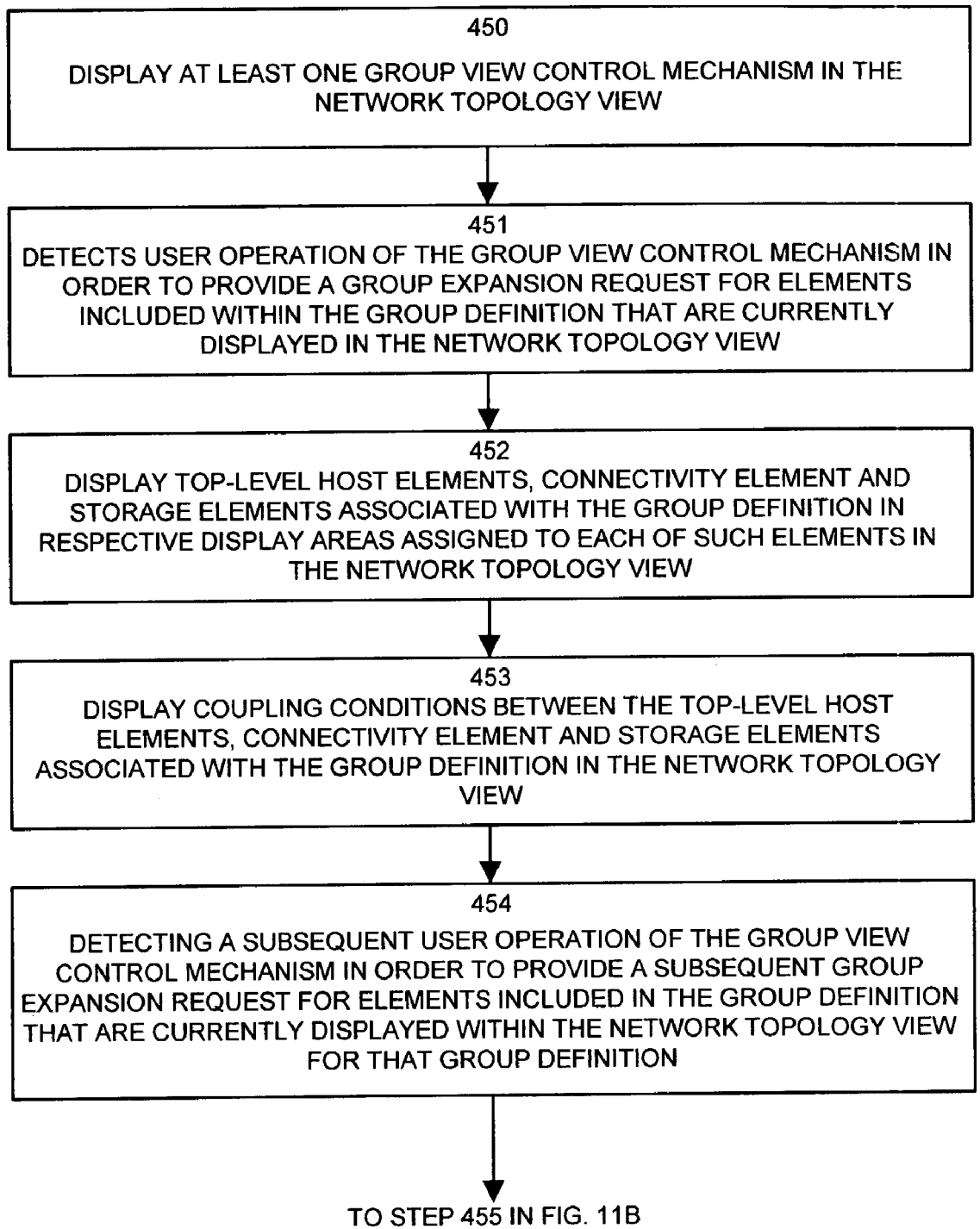
FIGS. 11A and 11B I flow chart of processing steps that a resource manager performs allowing a user to operate a group view control mechanism to expand a group element within the network topology view according to one example embodiment of the invention.
Figure 11B:
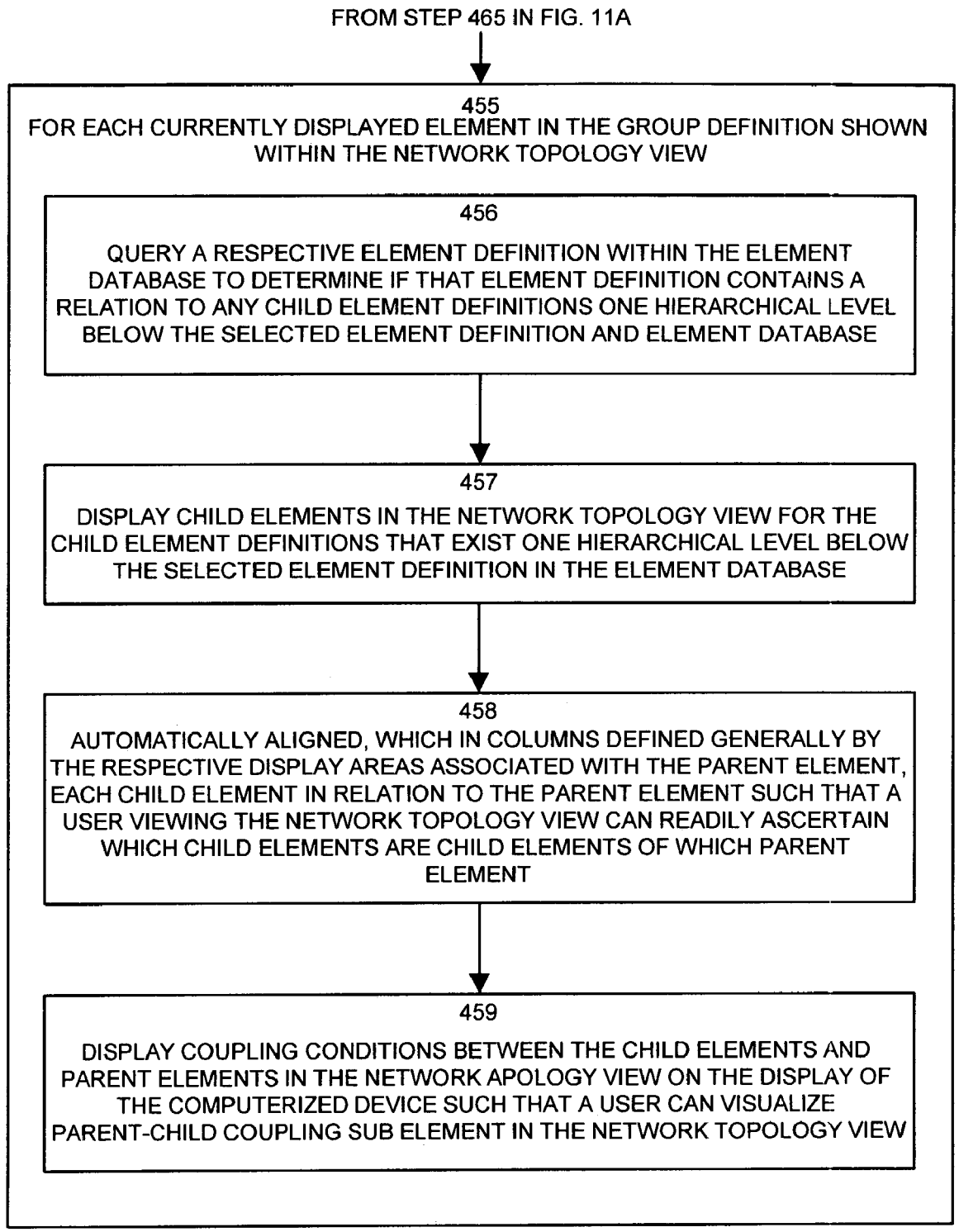

FIGS. 11A and 11B are a flow chart of processing steps performed by a resource manager 120 configured within the computerized device 110 in accordance with embodiments of the invention to perform operations associated with the group view control mechanism 220 in order to provide expansion and contraction of group elements within the network topology view 200.

In step 450 in FIG. 11A, the resource manager 120 displays at least one group view control mechanism 220, 186, 187 or 188 in the network topology view 200. The group view control mechanism (220 for this example) provides the user 108 with the ability to control group expansion and collapse operations associated with elements included in the group definition 165 that are associated with the group icon (e.g., 181-5) for which this group view control mechanism 220 is associated.

In step 451, the resource manager 120 detects user operation of the group view control mechanism 220 in order to provide a group expansion request for elements included in the group definition 165 that are currently displayed in the network topology view 200 (e.g., group element 184).

Next, in step 452, in response to detecting the user operation of the group view control mechanisms 220 in step 451, the resource manager 120 displays top-level host elements 171-1, connectivity elements 183 and 184 and storage elements 191-3 associated with the group definition in respective display areas 170, 180 and 190 assigned to each of such elements in the network topology view 200. Note that if a group only contains an association of elements from one or two of the display areas 170, 180 or 190, then the resource manager 120 will only display group elements in the areas associated with those group elements.

In step 453, after displaying all top-level elements in the group definition, the resource manager 120 displays coupling conditions between the top-level host elements 171 (if any), connectivity elements 181 (if any) and storage elements 191 (if any) associated with the group definition 165 in the network topology view 200. In this manner, the resource manager 120 graphically displays the coupling condition links 205 between the various elements of the top-level group view that are on display within the network topology view 200. In step 453, the resource manager 120 also displays the group view control mechanism 220 for further expansion or collapse operations for this group.

The processing of steps 451 through 453 is illustrated, for example, by the change in the network topology view 220 as it appears in FIG. 7 and then again in FIG. 9. That is, the processing of the step 451 through 453 in this example changes the view from that shown in FIG. 7 to that shown in FIG. 9 upon user operation of the group view control mechanism 186 in FIG. 7.

Next, in step 454 the resource manager 120 detects a subsequent user operation of the group view control mechanism 220 (now shown in FIG. 9, once the group is expanded) in order to provide a subsequent group expansion (or contraction or collapse operation) request for elements included in the group definition 165 that are currently displayed within the network topology view 200 for that group definition 165. As an example, in FIG. 9 the user may move a mouse pointer with the input device 116 (FIG. 2) in order to select the pull down menu of the group view control mechanism 220 or alternatively may select the group view expansion mechanism 187 or 188 in order to further expand the sub-group elements 183 and 184. As a specific example, suppose in step 454 the user selects the group view expansion mechanism 188 in order to further expand the sub-group element 184.

Next, at the top of FIG. 11B in step 455, the resource manager 120 enters a processing loop performed for each currently displayed element in the group definition 165 shown within the network topology view 200 (for the group that the user has selected for subsequent group expansion). Using the aforementioned example, the processing loop defined by step 455 proceeds for the currently selected group element 184 that has been selected for further expansion.

In step 456 the resource manager 120 queries a respective element definition (i.e., corresponding to the group element selected for expansion) within the element database 125 to determine if that element definition contains a relation to any child element definitions one hierarchical level below that selected element definition in the element database 125. In other words, for the sub-group element 184 illustrated in FIG. 9, when the user operates the group view expansion mechanism 188 (or 220) in order to further expand this sub-group to view the elements contained within this sub-group, the processing of step 456 operates to cause the resource manager 120 to query the element database 125 to determine which element definition(s) within the element database are child elements hierarchically related one level below the selected parent element definition corresponding to the sub-group element 184.

If the selected element definition contains relations to child element definitions in the element database 125, then in step 457 the resource manager 120 displays child elements (e.g., as illustrated in FIG. 10) in the network topology view 200 for the child element definition(s) that exist one hierarchical level below the selected element definition (i.e., selected for expansion) in the element database 125. In other words, in step 457 the resource manager 120 displays the child element definition(s) for child managed object(s) that exist within the group definition one hierarchical level below the group element that the user has selected for expansion in step 454.

In this example embodiment of the invention, as the resource manager 120 displays each child element having a corresponding child element definition within the network topology view 200, in sub-step 458 the resource manager 120 automatically aligns, within columns defined generally by the respective display areas 170,180 or 190 associated with the parent element, each child element in relation to that parent element such that a user 108 viewing the network topology view 200 can readily ascertain which child elements are child elements of which parent element. In other words, in step 458 this embodiment of the invention causes child elements to be displayed within respective display areas associated with component types equivalent to those child elements. As an example, if the user selects for expansion a group element containing a host device and a storage device as illustrated by the sub-group element 184 in FIG. 9, embodiments of the invention provide a network topology view 200 as illustrated in FIG. 10 in which the a child host element 171-2 is now displayed within the host display area 170 and the storage element 191-4 are displayed within storage display area 190. Accordingly, this embodiment of the invention further provides an automatic alignment feature in which groups may be expanded and elements within those groups are automatically displayed and placed within the proper display areas in order to convey to a user with types of devices correspond to those elements.

Note that is a user expands an element (either by selecting that element for expansion, or by expanding a group containing that element to a next lower level), embodiments of the invention also automatically align child elements with their parent elements. As an example, suppose a user 108 expands a host element (e.g., either via direct selection and double-clicking on that host element icon, or view operation of a group view control mechanism for a group containing that host element as a member), child elements such as host adapters are displayed to the right of the parent host element, and are distributed evenly as a list of child elements, with the list centered in relation to the parent host element, such that the user 108 can easily visually determine which child elements (i.e., which adapters) belong to or are associated with that parent host element. Likewise, children of expanded storage elements are displayed to the left of their parent elements. Children of connectivity elements, such as switch port elements, are displayed on either side of the parent connectivity element, depending upon what type of device (e.g., host or storage) shares a coupling condition with that switch port element. Thus, for expansion of connectivity elements (e.g., 181-1 or 181-4 as shown in FIG. 4), the child elements 181-2 or 181-3 representing switch port devices are displayed on a side of the parent (e.g., either the left or right) within the view 200 that corresponds to the type of device to which the switch port represented by that switch port element connects. If the port is not connected to another device, then the resource manager 120 can evenly distribute the switch port icon elements to both the left and right side to provide a balanced view, as illustrated by the example in FIG. 4.

Next, in step 459 the resource manager displays coupling conditions (e.g., as visible graphical links 205) between the child elements and parent elements in the network topology view 200 on the display of the computerized device such that a user can visualize parent-child couplings of elements in the network topology view 200. In the example illustrated in FIG. 10, the coupling conditions 205-6 and 205-7 represent logical links between host computerized devices represented by host elements 171-2 and data storage devices represented by storage elements 191-4.

From the aforementioned processing steps illustrated in the flow chart in FIGS. 11A and 11B, embodiments of the invention allow a user to operate the group view control mechanism 220 to expand a particular group element existing within the network topology view 200. In addition to being able to expand group elements, embodiments of the invention allow a user to collapse or contract the view of a set of visible elements related in the group such that those elements are represented by less element icons in order to condense the representation of the network topology view 200 into fewer graphical representations. This allows the user to manage a storage area network without having to see the entire representation of the network at once. Furthermore, network resources that are related in some manner, such as all being within one corporate department, or all being in a common location, or all being a similar host type (e.g., having a common manufacturer) can be group together and represented by a small set of icons (or even a single group icon) thus simplifying management of the elements in this group. A user 108 can, for example, apply a selected management task to the group icon in which case the resource manager 120 will apply this task to all devices or resources corresponding to elements within the group.

Figure 12:
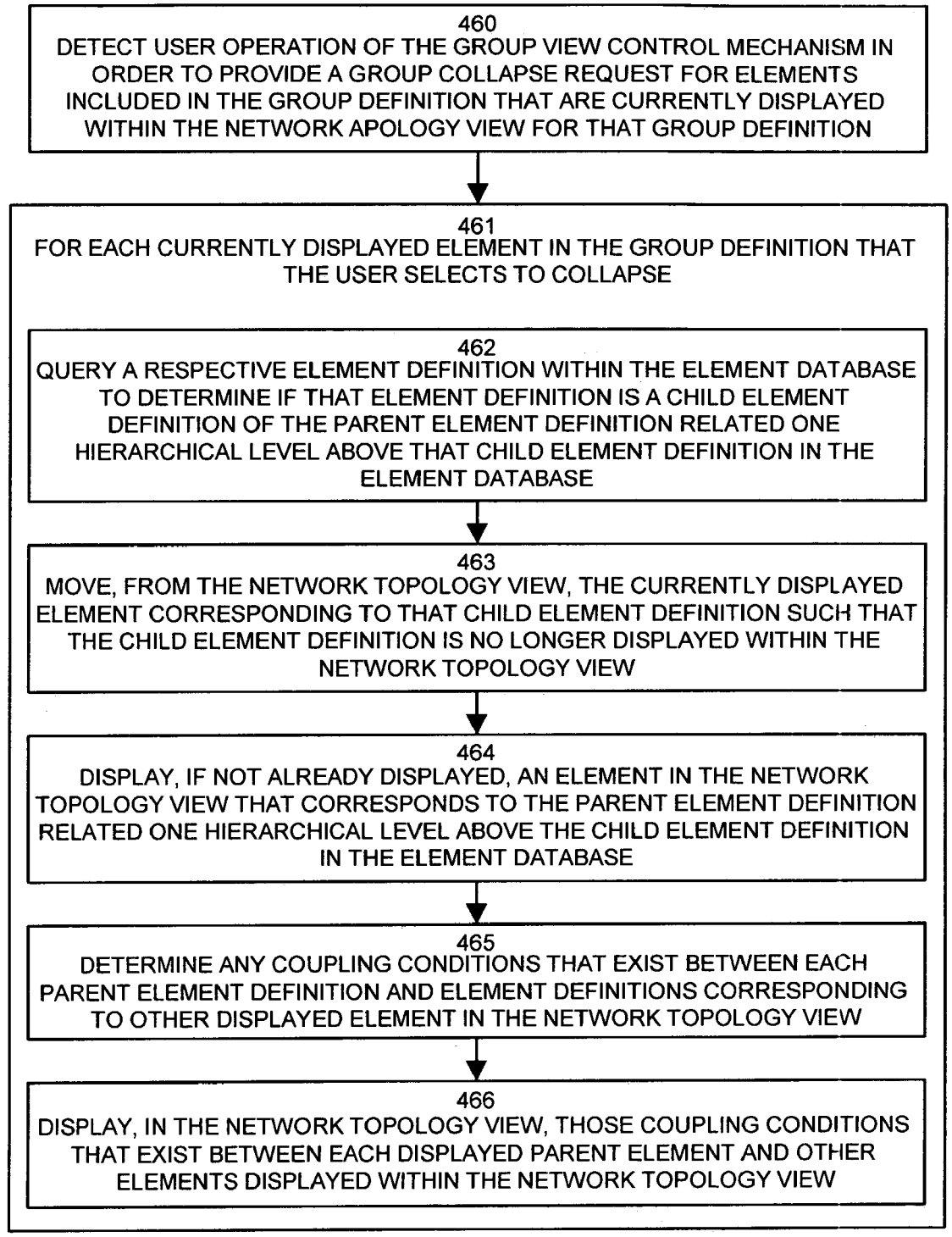
FIG. 12 is a flow chart of processing steps that a resource manager performs allowing a user to operate a group view control mechanism to collapse a group element within the network topology view according to one example embodiment of the invention.

Next, an example of processing steps performed according to embodiments of the invention to accomplish collapsing of elements related to a group definition is illustrated in the flow chart of processing steps and FIG. 12.

FIG. 12 is a flow chart of processing steps performed by a resource manager 120 configured in accordance with embodiments of the invention in order to collapse an already expanded group of visible elements one level (or more) in order to remove child elements in the network topology view and replace those child elements with their respective parent elements.

In step 460 the resource manager 120 detects user operation of the group view control mechanism 220 in order to provide a group collapse request for elements included in the group definition (e.g., 165) that are currently displayed within the network topology view 200 for that group definition 165. As an example illustrated in FIG. 10, in step 460 the resource manager 120 can detect user operation of the group view control mechanism 220 in order to select the "sub-group 1" selection 222 in order to collapse this group off related elements such that the child elements currently displayed to this parent elements are replaced within the network topology view by view as illustrated in FIG. 9 with a single parent group element 184. Note that the user may collapse more than one level at a time by selecting various menu choices (e.g., the top choice for total collapse of the group) corresponding to different levels of the hierarchy of elements in the group definition 165.

Next, in step 461 the resource manager 120 enters a processing loop performed for each currently displayed element in the group definition that the user 108 selects to collapse.

In step 462, the resource manager 120 queries a respective element definition within the element database 125 to determine if that element definition is a child element definition of a parent element definition related one hierarchical level above that child element definition in the element database 125. If the current elements within the group being processed in the loop defined by step 461 are child elements of a parent element definition, the resource manager 120 performs processing steps 463 and 464.

In step 463 the resource manager 123 moves, from the network topology view, the currently displayed element corresponding to that child element definition. As a result, this child element definition is no longer displayed within the network topology view 200 in FIG. 9 (but was displayed in FIG. 10 prior to this collapse operation).

Next, in step 464, the resource manager 120 displays, if not already displayed, an element in the network topology view that corresponds to the parent element definition related one hierarchical level above the child element definition ((i.e., the one removed from the view in step 463) in the element database 125. In other words, in step 464 resource manager 120 displays a parent element corresponding to the parent element definition that had the child element definition corresponding to the child element removed from the view in step 464. Stated differently, in step 464 the resource manager 120 removes the child element from the network topology view and replaces it with the parent element related hierarchically above that child element in the group definition 165.

Next, in step 465 the resource manager 120 determines any coupling conditions that exist between each parent element definition (i.e., for parent elements currently on display in the view 200) and element definitions corresponding to other displayed elements in the network topology view 200. In other words, in step 466, after removing child elements and displaying parent elements in the network topology view (as explained above in steps 464 and 465), the resource manager 120 now determines which other current visible elements in the network topology view, other than those newly displayed parent element(s), have or share coupling conditions or relationships to the parent element(s).

In step 466 the resource manager 120 displays, in the network topology view 200, those coupling conditions that exist between each displayed parent element and other elements displayed within the network topology view 200.

From the aforementioned description, embodiments of the invention allow the user to define groups of related elements that represent devices within a storage area network that the resource manager 120 can display within the network topology view along with the group view control mechanism 220. One example of the group view control mechanism 220 provide a group combination selection menu that includes a pull down menu for the user to view a list of currently displayed elements arranged in group levels. An example of this is illustrated in FIG. 10 in which the user has operated the group view control mechanism 220 to pull down a list of currently displayed groups of elements (i.e., different group levels) and in which the user has selected sub-group selection 222 from the group view control mechanism 220 in order to collapse this set of elements to return the network topology view 200 to its appearance as illustrated in FIG. 9. It is to be understood that the group view control mechanism may be a group combination selection mechanism of menu choices 220 as illustrated in FIG. 10 or alternatively may be one of the group expansion mechanisms 186, 187 or 188 illustrated in FIGS. 7 and 9.

Embodiments of the invention further allow a user to display zoning information within the network topology view 200 for a collection of storage area network devices arranged into a zone for access control purposes. As an example, the network administrator 108 of a storage area network may configure a zone to include certain host devices coupled to certain ports within the connectivity device such as a switch and other ports coupled to certain storage devices. Generally, zoning configuration is performed and reinforced within a connectivity device such as a switch to allow input-output (I/O) requests received on one port of the switch to only be directed toward certain other ports of the switch.

Figure 13:
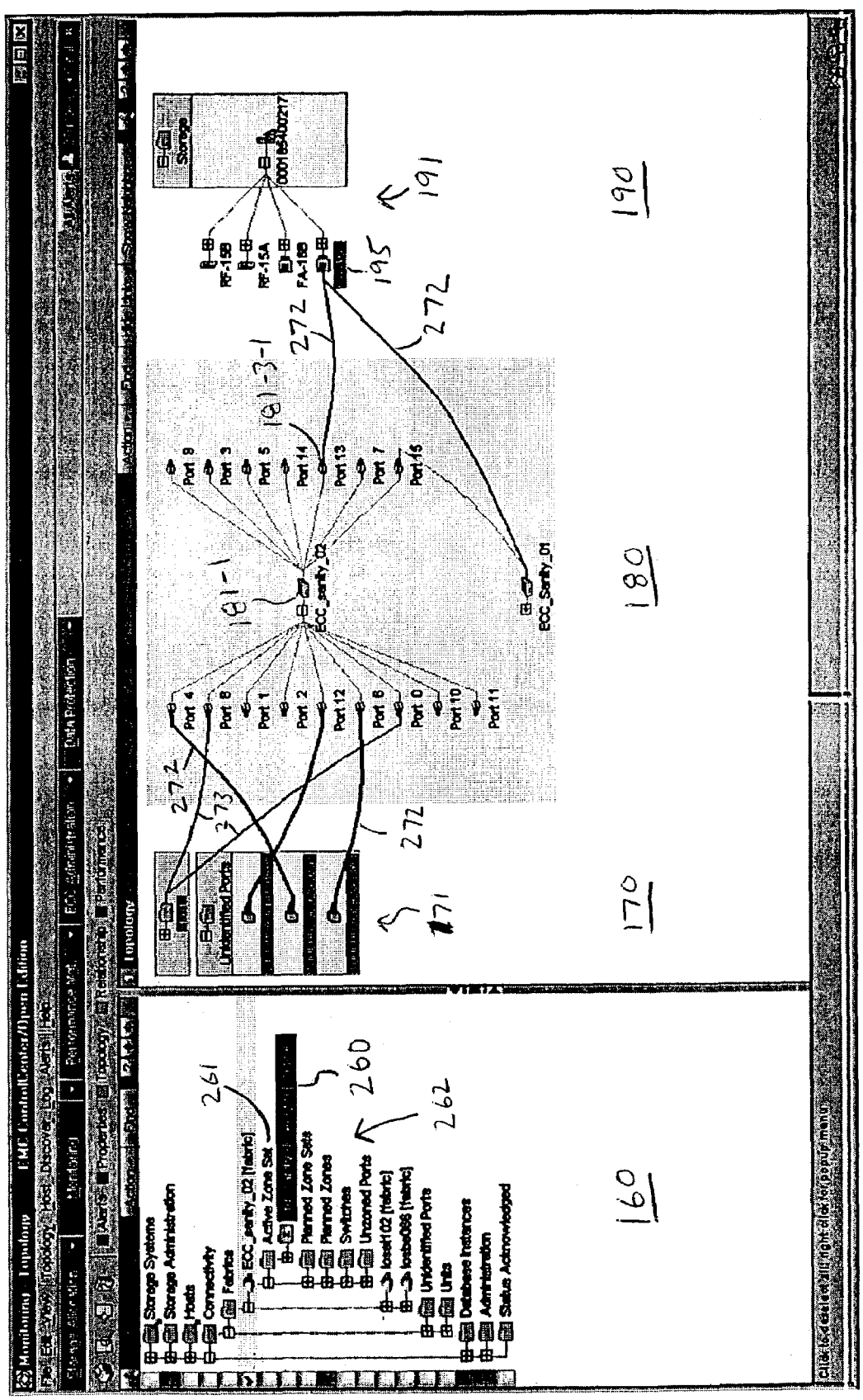
FIG. 13 shows another example of the graphical user interface including a network topology view in which a user has elected to view zone set information within the network topology view according to one embodiment of the invention can

FIG. 13 illustrates an example of the network topology view 200 configured to display zone set information associated with a particular zone configured within a storage area network. In this example, the user 108 has selected a particular zone set 260 from a collection of zone sets 261 and 262 that the resource manager 120 displays in expanded view within the hierarchical arrangement of icons 160. Upon doing so, the particular member elements associated with member devices within that selected zone set are highlighted for display within the network topology view 200. This allows the user to quickly determine which managed resources on display in the network topology view 200 are parts of the user-selected zone. In the illustrated example, host elements 171 have certain host adapter ports highlighted with coupling conditions 272 shown in bold or different color links to indicate that these coupling conditions are part of a zone selected by the user between the host elements 171 and the connectivity element 181-1 and its associated ports. Likewise, between the connectivity element 181-1 and the storage element 195 that corresponds to a port within a storage device represented by the storage elements 191, the resource manager 120 has highlighted the coupling condition links 272 to illustrate that these elements within the network topology view 200 are part of the zone 260 selected by the user.

Figure 14:
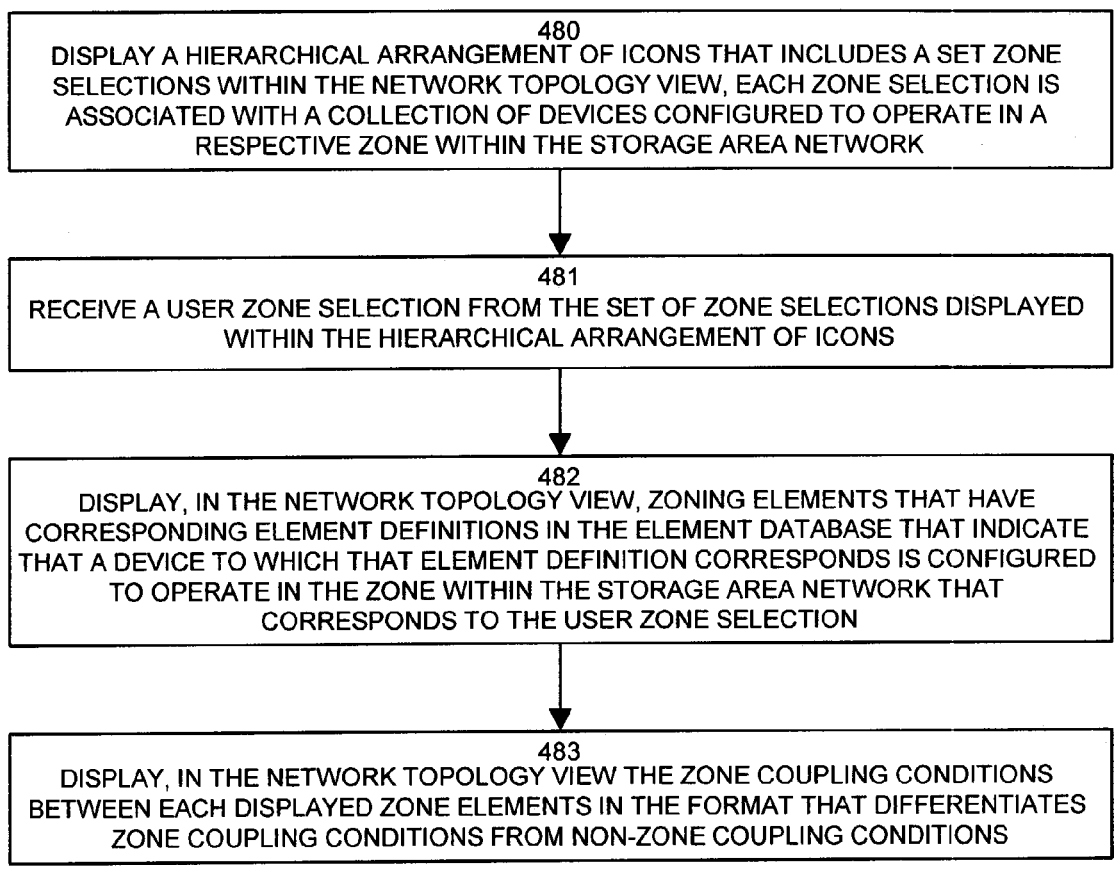
FIG. 14 is a flow chart of processing steps that a resource manager performs to display zone set information within a network topology view configured according to one example embodiment of the invention.

FIG. 14 is a flow chart of processing steps according to one example embodiment of the invention that illustrates the resource manager 120 processing zone set information to display zoned resources in the network topology view 200.

In step 480 the resource manager 120 displays a hierarchical arrangement of icons 160 that includes a set of zone selections 261 and 262 within the network topology view 200. Each zone selection is associated with a collection of devices configured to operate in a respective zone within a storage area network 100.

Next, in step 481 the resource manager 120 receives a user zone selection 260 from the set of zone selections 261, displayed within a hierarchical arrangement of icons 160. Referring to the example illustrated in FIG. 13, the user 108 has selected from a list of active zone sets 261 a particular zone selection 260 for display within the network topology view 200.

Next, in step 482 the resource manager 120 displays, in the network topology view 200, zoning elements 171, 181-1 and 191 (including 195) that have corresponding element definitions in the element database 125 that indicate that a device to which that element definition corresponds is configured to operate in the zone within the storage area network that corresponds to the user zone selection 260. In other words, in step 482 to the resource manager displays elements corresponding to the various devices configured within the zone that the user 108 selects.

Next, in step 483 the resource manager 120 displays, in the network topology view 200 zone coupling conditions 272 between each displayed zone elements (displayed in step 482) in a format that differentiates the zone coupling conditions from non-zone coupling conditions. In the example illustrated in FIG. 13, the resource manager 120 displays the zone coupling conditions as bold, highlighted or different colored or formatted links between the various elements of the zone displayed within the network topology view 200 so that the user 108 viewing this displayed can quickly identify those elements and data paths configured within the selected zone 260. Due to the linear layout of the respective host, connectivity and storage display areas 170, 180 and 190 of the network topology view 200 as provided by embodiments of this invention, identification of zone elements and zone coupling conditions allows the user to quickly identify how particular host elements 171 in the host display area 170 can intercommunicate within the selected zone to particular storage elements 191 within the storage display area 190 through connectivity elements 181.

Embodiments of the invention further provide the ability for a user 108 to select one or more elements 171, 181 and/or 191 within the network topology view 200 in order to identify direct neighbors of such selected elements. In other words, embodiments of the invention provide a "show neighbors" processing operation that allows the user, for example, to select a particular host elements, storage element or connectivity element. In response, the resource manager 120 displays the selected device along with each neighboring element corresponding to a host, connectivity or storage device that has a direct coupling condition associated with that selected host device.

Figure 15:
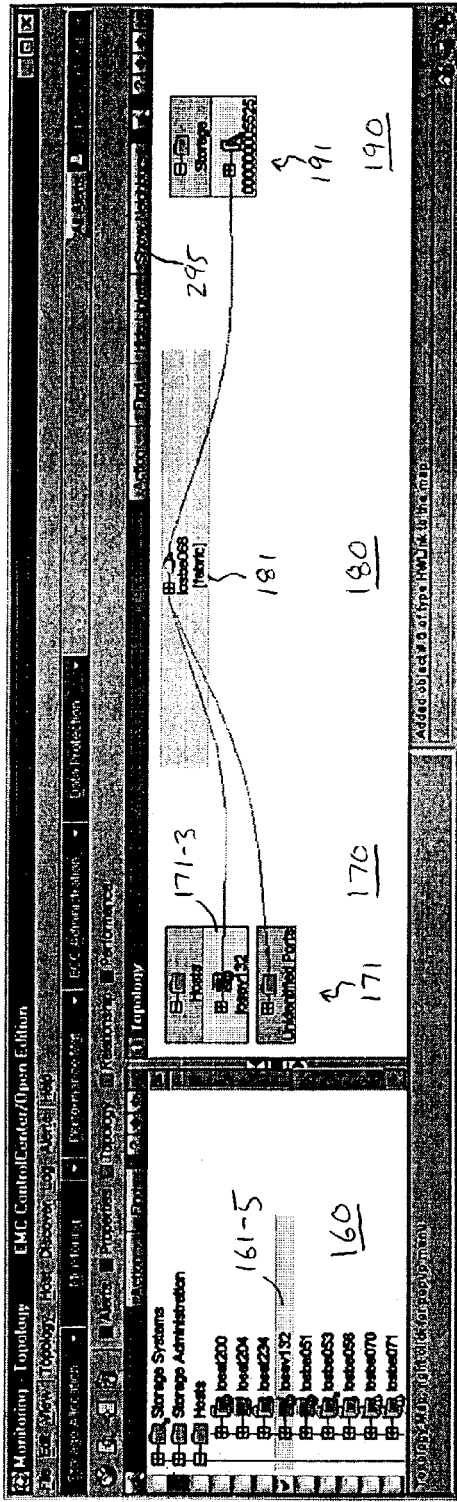
FIG. 15 is an example of the graphical user interface including a network topology view in which a user selects an element to view neighboring elements in accordance with one example embodiment of the invention.
Figure 16:
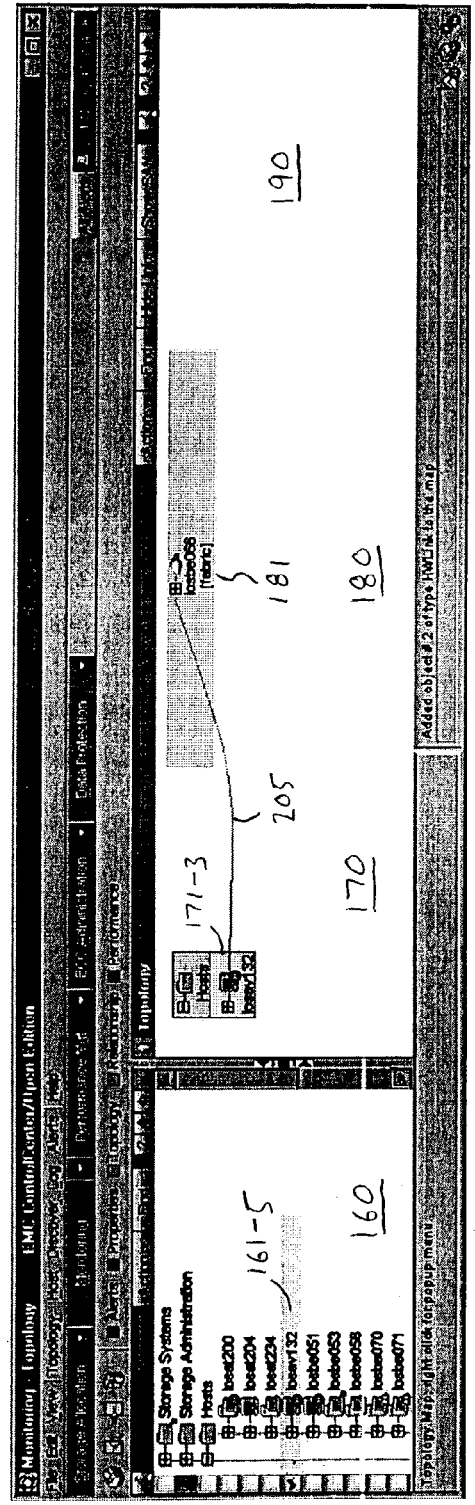
FIG. 16 is an example of the graphical user interface including a network topology view that results from the user selecting an element to view neighboring elements in accordance with one example embodiment of the invention.

FIGS. 15 and 16 illustrates an example of the show neighbors functionality provided by embodiments of the invention. In particular, in FIG. 15 the user views the network topology view containing an arrangement of host elements 171, a single connectivity element 181 (that happens to be an unexpanded group element in this example) and some storage elements 191. In this example, suppose that the user 108 is interested in knowing which elements within the storage area network directly couple to the particular host element 171-3. To determine this, the user selects the host element 161-5 within the hierarchical arrangement of icons 160. In addition, the user activates the show neighbors operation 295 displayed as a menu choice along the top of the network topology view 200. This action indicates to the resource manager 120 that the user 108 desires to view only those elements that have a direct connection to a host element corresponding to the user selection 161-5 which is represented within the network topology view as host element 171-3. As a result of this processing, the resource manager 120 produces a network topology view 200 as illustrated in FIG. 16.

In FIG. 16 the resource manager 120 displays a network topology view 200 that includes only the selected host element 171-3 corresponding to the user selection 161-5 as well as any coupling conditions 205 and neighboring elements, which in this example is only the group connectivity element 181. In other words, activation of the show neighbors operation 295 causes the resource manager 120 to display the selected network element to which the show neighbors operation 295 is to be applied and further causes the resource manager 120 to determine which other devices within the storage area network are directly coupled to the selected element and to display these as directly coupled elements along with associated coupling conditions on the network topology view 200.

This show neighbor operation provided by embodiments of the invention allows the user to quickly determine which devices are directly coupled to a device of interest within the storage area network 100. This is useful in situations where a user may desire, for example, to perform a management operation on a particular network device while assessing any potential impact on neighboring devices. As a specific example, consider a situation in which a user desires to shut down a particular host computerized device. In order to determine how this host shut down will impact the rest of the storage area network 100, the user can operate the show neighbor functionality 295 provided by embodiments of the invention in order to determine what other devices in the network couple to the particular host computerized device that is to be shut down.

Figure 17:
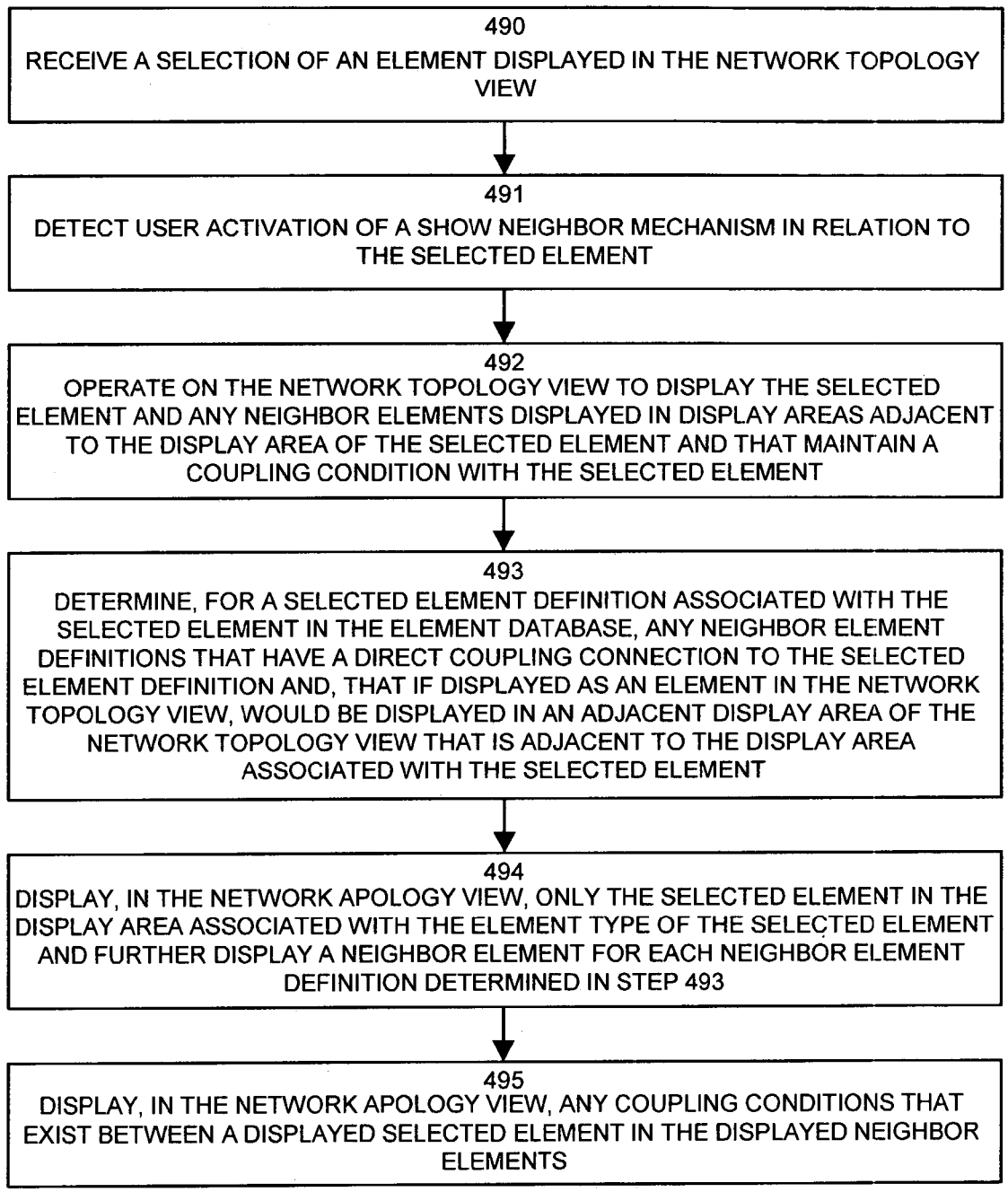
FIG. 17 is a flow chart of processing steps that a resource manager performs to perform the show neighbors operation in accordance with one example embodiment of the invention.

FIG. 17 is a flow chart of processing steps performed according to embodiments of the invention to provide the show neighbor functionality explained in the examples above with respect to FIGS. 15 and 16.

In step 490, the resource manager 120 receives a selection 161-5 of an element 171-3 displayed in the network topology view 200. In the example discussed above, the user 108 provides the selection 161-5 within the hierarchical arrangement of icons 160. In an alternative embodiment, the user can simply select the host element icons 171-3 directly within the network topology view 200 if the element of interest is already on display.

In step 491 the resource manager 120 detects user activation of a show neighbor mechanism 295 in relation to the selected element 171-3.

Next, in step 492, in response to detecting user activation of the show neighbor mechanism 295, the resource manager 120 operates on the network topology view 200 to display the selected element 171-3 and any neighbor elements (181 in the example in FIG. 16) displayed in display areas adjacent to the display area (170 in the example) of the selected element and that maintain a coupling condition with the selected element. Details of processing for step 492 are shown in sub-steps 493 through 495.

In step 493 the resource manager 120 determines, for a selected element definition associated with the selected element in the element database 125, any neighbor element definitions that have a direct coupling connection condition to the selected element definition and, that if displayed as an element in the network topology view, would be displayed in an adjacent display area of the network topology view that is adjacent to the display area associated with the selected element. In other words, in step 493 the resource manager 120 queries to database to determine which element definitions are related to the element definition of the selected element 171-3 via a direct coupling condition.

Next, in step 494 the resource manager 120 displays, in the network topology view 200, only the selected element 171-3 in the display area 170 associated with the element type of the selected element (e.g., host display area 170 in the example, since the selected element is a host element) and further displays a neighbor element for each neighbor element definition determined in step 493. In other words, in step 494 the resource manager 120 only displays the selected element 171-3 along with any of its direct neighbor elements 181 (for the example illustrated in FIG. 16).

In step 495 the resource manager 120 displays, in the network topology view 200, any coupling conditions 205 that exist between the displayed selected element 171-3 and the displayed neighbor elements 181. In this manner, embodiments of the invention allow a user 108 to quickly ascertain which devices have direct neighbor couplings to a particular selected device of interest.

Those skilled in the art will understand that there can be many other variations made to the operations of the embodiments explained above while still achieving the same objectives of the invention. As an example, particular configurations of the network management application may include only certain embodiments of the invention and need not include all functionality explained herein. Furthermore, processing operations to control the display of the network topology view 200 can be rearranged while still providing a network topology view 200 as explained herein. As an example, during display operations of elements and coupling conditions between elements, alternative embodiments of the invention may display coupling conditions first as opposed to displaying elements first. In addition, it is to be understood that certain features of the operations explained herein are applicable to many types of network topology views. As an example, when a user elects to view member elements of a group, embodiments of the invention can highlight or otherwise differentiate group elements within the topology display, as explained above, and can also highlight or otherwise indicate group member elements in other areas of the display, such as in the hierarchical arrangement of icons.

As another example, coupling conditions (e.g., links) may exist between the connectivity elements in relation to either one or both of (i.e. at least one of) the host elements and/or the storage elements. In addition, there may be coupling conditions between just a host element and a storage element without a coupling condition to a connectivity element being required. In such a case, the coupling condition may or may not represent physical connectivity (e.g., may be a logical link).

In addition, it is to be understood that operation of the network topology view 200 can handle events in a dynamic manner. For instance, if a user selects a host element that does not have any connections (coupling conditions) with other elements, than this host element may appear on the view 200 unconnected to other elements. Thereafter, if suddenly due to discovery or some other reason, the host corresponding to this host element gets connected to the network, the embodiments of the invention cause the view 200 to be dynamically refreshed to show the rest of the network to which this host is now connected. Similarly if the host was connected to something (e.g., a switch port) and if that link to that port breaks or goes down for some reason, embodiments of the invention can detect this event and refresh the view 200 to remove this link unless the link has reason to remain visible because, for example, something else in addition to that port were connected to the host. The dynamic nature of the display also applies if relationships between elements change. For example, if a switch suddenly becomes part of a fabric shown as a group element, then the fabric, along with other switch children would be added to view 200. In other words, embodiments of the invention maintain the view state such that at any point in time, the view 200 shows all the elements as if the view were created for the first time using that particular choice of selections.

As a result, in one embodiment of the invention, the system can detect an occurrence of a connection condition between at least two devices corresponding to elements in the network topology view. The connection condition can reflect either the existence of a new connection between the at least two devices or removal of an existing connection between the at least two devices that have corresponding elements in the view 200. In response to detecting occurrence of the connection condition, the resource manager can dynamically alter the network topology view to correspond to the occurrence of a connection condition such that if the connection condition reflects the existence of the new connection between the two (or more) devices, a coupling condition is displayed as a link in the network topology view between the elements corresponding to the at least two devices. However, if the connection condition reflects the removal of an existing connection between the devices, a coupling condition is removed as a link in the network topology view between the elements corresponding to the at least two devices. In this manner, a user viewing the network topology view sees the dynamically altered network topology view (e.g., the appearance or removal of links) in response to the connection change between the devices.

In a further variation, the resource manager process can allow the user to toggle display of coupling condition links on or off. In doing so, the resource manager receives a user link toggle selection indicating the user does not desire to view the coupling conditions, and in response, removes coupling conditions from the network topology view. In this manner, a busy display can have all links removed from view to aid the user in selecting or viewing certain elements only. In addition, the resource manager can detect movement of a user selection device, such as a mouse pointer, within a predetermined distance (e.g., 10 pixels) of an element icon on the display. In response, the resource manager can display only coupling conditions in the network topology display related to that element icon for which the user selection mechanism is within the predetermined distance, thus indicating to the user only those coupling conditions related to the icon element nearby the user selection mechanism. Thus, when the user toggles the links "off" so that none are displayed and moves the mouse around the view 200, element icons nearby the mouse have their link-on property activated so that coupling condition links from only this nearby icon are shown, while all others are still turned off (i.e., are not displayed). This allows a user to quickly determine just what connections exist to a particular storage area network element.

In another embodiment, groups representing switch fabrics can be indicated using a background colored block which represents a common group identity. Thus children elements of the group, such as individual switches (members) also have the same background color block to visually signify that they belong to a common group. A user is able to select (e.g., grab or drag and drop) a switch element to another part of the view 200 and the common color allows easy identification with the common group. In addition, when the user places two common group elements adjacent to each other, these colored blocks blend together.

In a further embodiment, the resource manager displays only those user selected elements in the network topology view 200, and only that element's neighbors as well. However, if a neighbor is a connectivity element representing, for example, a switch device, then in this embodiment the resource manager traverses all links that connect to this connectivity device and show its neighbors as well. This second step can be recursive in nature such that any connectivity element causes the search to go on and on and thus additional elements are displayed in the view 200.

In another embodiment, the resource manager can perform automatic or pre-arranged grouping of elements. Such groups are called "arranged groups" and the resource manager can group common elements such as hosts, storage devices and unidentified devices into a common element icon automatically, without the user having to select each host, storage device, and the like. In this manner, embodiments of the invention can perform the grouping functions above, but do not require user initiation to show, for example, hosts in a group. Instead, all hosts can be grouped automatically in the hierarchical arrangement of icons, and a single group element icon in the view 200 can be shown to represent all hosts. Arranged groups can have "arrange-by" properties which allow the resource manger to automatically create sub-folders underneath them, and organize their real members (e.g., hosts or other managed objects) into these sub-folders. As an example, embodiments of the invention allow the user to select an arrange by operation such as "by Name" to sort the actual host elements placed into the arranged by hosts group by the name of each host. Other properties can be used as well such as arrange by vendor. This feature provides a common place for the user to look for similar elements, (e.g. look for any host in the "Hosts" group element folder), and also by arranging by "Name" and creating sub-group folder element, this embodiment reduces the clutter in the map allowing the user to expand only the subfolder containing the element he or she is looking for.

As an example of arranged groups, embodiments of the invention can combine group elements corresponding to Hosts, Storage Arrays and/or Unidentified Ports into respective arranged group elements to minimize clutter in the network topology view 200. These arranged group elements conveniently group the member elements by "Name" and the resource manager automatically generates sub-folders, which actually contain the member elements when expanded by the user. These sub-folders can have names by convention, such as, for example "first member . . . last member" where first member and last members are first and last respective elements when all the member elements are sorted by name. In addition, in this example, the user can have the option to arrange elements in a group by "None" if he or she chooses to not arrange them. In this case the resource manager can make the sub-groups elements folders disappear, and the member elements appear directly under the respective arranged group folders.

In a further embodiment, the user is able to edit the view to move the elements around. This embodiment provides a drag and drop mechanism to move elements in and out of arranged groups. One importance of this feature is that, although the default layout tries to present the information in an easy way to navigate and understand network configuration, the user might still want to re-arrange the nodes as per his convenience. As an example, the user can move a host out of the arranged group and place it in one corner of the view 200 to allow easy and frequent access to that host quite often via its corresponding element in the view. In addition, embodiments of the invention allow the user to have persistent network topology views and thus if the layout changes due to user movement of elements, the user can save the layout as is and can later retrieve the view from its save form.

As an example, the user can move elements in the network topology view by clicking on a move tool (e.g., a toggle button on the graphical user interface) and then dragging the element. The user can, for example, move top level parents elements up or down in the same column or display area or to other display areas 170, 180 or 190. All parent elements in a display area are aligned. Each element can have a virtual bounding box into which other object's bounding boxes cannot encroach. Accordingly, in this example embodiment, if user moves an element between two other elements where it doesn't fit, elements beneath it shift down successively until there is enough space. As users expand or collapse elements, the bounding boxes for each element adjust and elements beneath move down if necessary to make space for the new bounding boxes that include the expanded children elements. In addition, elements that have been displaced this way move back to reuse the space when the element is collapsed.

In another embodiment, children elements can appear in a vertical row, with no extra spaces, on either side of a top-level parent element or one side of a lower level parent element. A user can change order of children elements (or move a child element to the other side in the case of a top level parent element). In one embodiment, a user cannot move a child out of a column of children. In addition, an element that is moved is represented by a ghost image of that element. The ghost shows the approximate new position if the element if it were dropped at that point. Hence this embodiment provides a visual explanation to the user of move constraints. After the user drops the element, the resource manager can perform a layout that repositions all the element affected by the move. Further still, a user can move an element in and out of an arranged group. This is only applicable in this example to elements that would have been top-level elements if they weren't grouped. When the user drops an element into a group element, either the group element or its named-subgroups can flag that they are willing to take a drop by changing their box color to red or by using another differentiating mechanism.

Such variations are intended to be covered by the scope of this invention. As such, the foregoing description of embodiments of the invention is not intended to be limiting. Rather, any limitations to embodiments of the invention are presented in the following claims.

What is claimed is:

1. A method for visualizing elements of a network within a network topology view on a display of a computerized device, the method comprising the steps of:

displaying a host element in a host display area of the network topology view on the display of the computerized device;

displaying a storage element in a storage display area of the network topology view on the display of the computerized device;

displaying a connectivity element in a network display area of the network topology view on the display of the computerized device, the network display area displayed in between the host display area and the storage display area on the display of the computerized device;

determining a coupling condition of the connectivity element in relation to at least one of the host element and the storage element; and displaying the coupling condition as a link on the display of the computerized device between the connectivity element and the at least one of the host element and the storage element to which that coupling condition relates in order to visually convey the coupling condition to a user viewing the network topology view on the display of the computerized device;

maintaining a database containing at least one respective element definition for each device within a storage area network;

detecting an occurrence of a connection condition between at least two devices corresponding to elements in the network topology view, the connection condition reflecting at least one of an existence of a new connection between the at least two devices and removal of an existing connection between the at least two devices; and in response to detecting occurrence of the connection condition, dynamically altering the network topology view to correspond to the occurrence of a connection condition such that if the connection condition reflects the existence of the new connection between the at least two devices, a coupling condition is displayed as a link in the network topology view between the elements corresponding to the at least two devices, and such that if the connection condition reflects the removal of an existing connection between the at least two devices, a coupling condition is removed as a link in the network topology view between the elements corresponding to the at least two devices, such that a user viewing the network topology view sees the dynamically altered network topology view in response to the connection change between the at least two devices.

2. The method of claim 1 comprising the step of:

displaying a hierarchical arrangement of icons associated with host elements, storage elements, and connectivity elements maintained within a storage area network element database; and receiving, from the hierarchical arrangement of icons, a user selection of elements including the host element, the storage element and the connectivity element; and in response to the step of receiving a selection, displaying the user selection elements by performing the steps of displaying the host element, displaying the connectivity element and displaying the storage element in respective display areas of the network topology view.

3. The method of claim 2 wherein the step of determining a coupling condition for the connectivity element in relation to at least one of the host element and the storage element comprises the steps of:

querying the network element database to determine if the host element has a coupling associated with the connectivity element; and querying the network element database to determine if the storage element has a coupling associated with the connectivity element;

and wherein the step of displaying the coupling condition comprises the steps of:

if the host element has a coupling associated with the connectivity element, drawing a visual coupling between the host element and the connectivity element; and if the storage element has a coupling associated with the connectivity element, drawing a visual coupling between the storage element and the connectivity element.

4. The method of claim 2 wherein the step of receiving, from the hierarchical arrangement of icons, a selection of the host element, the storage element and the connectivity element comprises the steps of:

receiving a group definition including a selection of user selected elements from the hierarchical arrangement of icons associated with host elements, storage elements, and connectivity elements;

associating, to the group definition, the user selected elements as well as elements defined by element definitions in at least one element database that are hierarchically related below element definitions corresponding to the user selected elements; and wherein the step of displaying the user selection of elements comprises the step of:

displaying a group icon to represent the group definition within the network display area of the network topology view on the display of the computerized device; and displaying at least one coupling condition as a link extending from the group icon to at least one other element icon in the network topology view to represent a connection from a device corresponding to at least one user selected element in the group definition to at least one other device corresponding to the at least one other element icon.

5. The method of claim 4 wherein the step of displaying a group icon comprises the steps of:

displaying the group icon in collapsed form, such that user selected elements within the group definition represented by the group icon are not individually displayed in the network topology view; and wherein the method comprises the steps of:

receiving a group expansion request from a user to expand the group icon such that at least one coupling condition existing between the user selected elements within the group is visually displayed to the user; and in response to receiving the group expansion request, operating a group display mechanism to perform the steps of:

displaying at least a portion of the user selected elements included in the group definition in the network topology view on the display of the computerized device, each element of the portion of the display user selected elements being displayed in a respective display area associated with a element type associated with that element;

determining a set of group coupling conditions that exist between the portion of the user selected elements included in the group definition that were displayed in the network topology view; and displaying the set of group coupling conditions that exist between the displayed portion of the user selected elements included in the group definition such that a user providing the group expansion request can view an interconnection of those elements within the group.

6. The method of claim 4 wherein the step of displaying a group icon comprises the step of:

displaying at least one group view control mechanism in the network topology view, the group view control mechanism providing the user with the ability to control group expansion and collapse operations associated with elements included in the group definition associated with the group icon.

7. The method of claim 6 comprising the steps of:

detecting a user operation of the at least one group view control mechanism in order to provide a group expansion request for elements included in the group definition that are currently displayed in the network topology view for that group definition, and in response to detecting a user operation:

displaying top-level host elements, connectivity elements and storage elements associated with the group definition in respective display areas assigned to each of such elements in the network topology view; and displaying coupling conditions between the top-level host elements, connectivity elements and storage elements associated with the group definition in the network topology view.

8. The method of claim 7 comprising the steps of:

detecting a subsequent user operation of the at least one group view control mechanism in order to provide a subsequent group expansion request for elements included in the group definition that are currently displayed in the network topology view for that group definition; and for each currently displayed element in the group definition, querying a respective element definition within the at least one element database to determine if that element definition contains a relation to any child element definitions one hierarchical level below that element definition in the at least one element database, and if so, displaying child elements in the network topology view for the child element definitions one hierarchical level below that element definition in the at least one element database; and displaying coupling conditions between the child elements and parent elements in the network topology view on the display of the computerized device such that a user can visualize parent-child couplings of elements in the network topology view.

9. The method of claim 8 wherein the step of displaying child elements in the network topology view comprises the step of:

automatically aligning, within columns in respective display areas associated with the parent elements, each child element in relation to the parent element such that a user viewing the network topology view can readily ascertain which child elements are child elements of which parent elements.

10. The method of claim 6 comprising the steps of:

detecting user operation of the at least one group view control mechanism in order to provide a group collapse request for elements included in the group definition that are currently displayed in the network topology view for that group definition;

for each currently displayed element in the group definition, querying a respective element definition within the at least one element database to determine if that element definition is a child element definition of a parent element definition related one hierarchical level above that child element definition in the at least one element database, and if so, performing steps of:

removing, from the network topology view, the currently displayed element corresponding to that child element definition; and displaying, if not already displayed, an element in the network topology view that corresponds to the parent element definition related one hierarchical level above that child element definition in the at least one element database; and after performing the steps of removing the currently displayed element and displaying the parent element for each currently displayed element in the group definition, performing the steps of:

determining coupling conditions that exist between each displayed parent element definition and element definitions corresponding to other displayed elements in the network topology view; and displaying, in the network topology view, the coupling conditions that exist between each displayed parent element definition and the element definitions corresponding to other displayed elements in the network topology view.

11. The method of claim 6 wherein the group view control mechanism is at least one of a group combination selection mechanism and a group quick collapse mechanism; and wherein the step of displaying a group icon comprises the step of displaying group element icons that are members of a common group in a format that differentiates the group element icons from other element icons in the network topology view such that a user can visually associate the group element icons to one another based on the format.

12. The method of claim 1 comprising the steps of:

displaying a hierarchical arrangement of icons including a set of zone selections, each zone selection being associated with a collection of devices configured to operate in a zone within a storage area network;

receiving a user zone selection from the set of zone selections displayed in the hierarchical arrangement of icons;

displaying, in the network topology view, zone elements that have corresponding element definitions in at least one element database that indicate that a device to which that element definition corresponds is configured to operate in the zone within the storage area network that corresponds to the user zone selection; and displaying, in the network topology view, zone coupling conditions between each displayed zone element in a format that differentiates the zone coupling conditions from non-zone coupling conditions.

13. The method of claim 1 comprising the steps of:

receiving a selection of an element displayed in the network topology view;

detecting user activation of a show neighbor mechanism in relation to the selected element; and in response to detecting user activation of the show neighbor mechanism, operating on the network topology view to display the selected element and any neighbor elements displayed in display areas adjacent to the display area of the selected element and that maintain a coupling condition with the selected element.

14. The method of claim 13 wherein the step of operating on the network topology view to display the selected element and any neighbor elements comprises the steps of:

determining, for a selected element definition associated with the selected element in at least one element database, any neighbor element definitions that have a direct coupling condition to the selected element definition and that if displayed as an element in the network topology view, would be displayed in an adjacent display area of the network topology view that is adjacent to the display area associated with the selected element;

displaying, in the network topology view, only
  i) the selected element in the display area associated with an element type of the selected element; and
  ii) a neighbor element for each neighbor element definition determined in the step of determining any neighbor element definitions; and displaying, in the network topology view, any coupling conditions that exist between the displayed selected element and the displayed neighbor elements.

15. The method of claim 1 comprising the steps of:

detecting a management event associated with an element definition in at least one element database, the element definition corresponding to at least one of the host element, the connectivity element and the storage element displayed on the network topology view; and modifying a display attribute of an element displayed on the network topology view that corresponds to the element definition to which the detected management event is associated in order to reflect the detected management event, such that a visual indication of the detected management event is provided to a user viewing the network topology view on the display of the computerized device.

16. The method of claim 1 comprising the steps of:
receiving a user expansion selection of an element displayed on the network topology view; and
performing element expansion processing to display child elements associated with the element for which the user expansion selection was received, the child elements being positioned within the display area of the network topology view associated with the selected element.

17. The method of claim 16 wherein child elements represent interface devices associated with at least one of the host element, connectivity element and storage element displayed in the network topology view and wherein the method comprises the step of:
receiving a user link toggle selection indicating the user does not desire to view the coupling conditions, and in response, removing coupling conditions from the network topology view; and
detecting movement of a user selection device within a predetermined distance of an element icon, and in response, displaying only coupling conditions in the network topology display related to that element icon for which the user selection mechanism is within the predetermined distance, thus indicating to the user only those coupling conditions related to the icon element nearby the user selection mechanism.

18. The method of claim 1 comprising the steps of:
receiving a user link toggle selection; and
in response to the user link toggle selection, removing the coupling condition displayed as a link on the network topology view.

19. The method of claim 1 wherein the coupling condition displayed on the network topology view defines a logical coupling representing at least one actual physical coupling existing between an connectivity device associated with the connectivity element and at least one of a host device and a storage device associated with the at least one host element and storage element displayed on the network topology view.

20. The method of claim 1 wherein:
the connectivity element represents at least one switch that operates in a storage area network;
the host element represents at least one host computer operating in the storage area network;
the storage element represents at least one storage device operating in the storage area network; and
the coupling condition displayed as a link on the network topology view represents at least one physical coupling between the at least one host computer and the at least one switch and between the at least one switch and that at least one storage device operating in the storage area network.

21. The method of claim 20 wherein an element displayed in a display area of the network topology display is a parent element that represents a plurality of actual devices associated with that parent element, and wherein the method comprises the steps of:

receiving a selection of the parent element;
expanding a display of the selected parent element within the respective display area in which that selected parent element is displayed in the network topology view, the expanded display of that parent element including a display of respective child elements corresponding to each of the plurality actual devices represented by the parent element, such that a user viewing the network topology view can visually identify the child elements that correspond to the specific actual child devices associated with a parent device represented by the selected parent element.

22. The method of claim 21 wherein the step of expanding the display of the selected parent element comprises the step of:
automatically aligning the child elements displayed in relation to the parent element such that a parent-child element relationship is visually conveyed to the user view the network topology display and such that all child elements for a parent element are displayed within the display area of the network topology view associated with the parent element;
removing all coupling conditions displayed in the network topology view from the selected parent element to any other elements in the network topology view;
displaying coupling conditions that exist between the selected parent element and its associated displayed child elements; and
displaying coupling conditions that exist between each respective child element of the selected parent element and other elements that are displayed in the network topology view that are different that the selected parent element.

23. The method of claim 22 wherein:
the parent element represents a switch fabric and wherein the child elements represent individual storage area network switches within the switch fabric.

24. The method of claim 2 comprising the steps of:
automatically categorizing elements of at least one common type into an arranged group element such that the arranged group element represents a categorized elements;
receiving a user selection of the arranged group element; and
expanding the arranged group element to display child elements of the arranged group element corresponding to the automatically categorized elements of the at least one common type.

25. The method of claim 2 comprising the steps of:
receiving a user selection of an element;
detecting a user move operation of the element;
in response to detecting the user move operation, operating an element move mechanism to allow the user to move the element to another location in the network topology display, the user move operation including at least one of:
moving the element into at least one group;
moving the element into at least one other display area in the network topology view; and
moving the element into at least one other location of the display area currently corresponding to the element.

26. A computerized device comprising:
a display;
a memory system;
a processor; and
an interconnection mechanism connecting the display, the processor and the memory system;

wherein the memory system is encoded with a resource management application that when performed on the processor, produces a resource management process that provides a graphical user interface produced on the display of the computerized device, the graphical user interface allowing a user of the computerized device to visualize elements of a network within a network topology view, the resource management process performing the operations of:

displaying a host element in a host display area of the network topology view on the display of the computerized device;

displaying a storage element in a storage display area of the network topology view on the display of the computerized device;

displaying a connectivity element in a network display area of the network topology view on the display of the computerized device, the network display area displayed in between the host display area and the storage display area on the display of the computerized device;

determining a coupling condition of the connectivity element in relation to at least one of the host element and the storage element; and displaying the coupling condition as a link on the display of the computerized device between the connectivity element and the at least one of the host element and the storage element to which that coupling condition relates in order to visually convey the coupling condition to a user viewing the network topology view on the display of the computerized device, the resource management process performing the operations of:

displaying a hierarchical arrangement of icons associated with host elements, storage elements, and connectivity elements maintained within a storage area network element database; and receiving, from the hierarchical arrangement of icons, a user selection of elements including the host element, the storage element and the connectivity element; and in response to the step of receiving a selection, displaying the user selection elements by performing the steps of displaying the host element, displaying the connectivity element and displaying the storage element in respective display areas of the network topology view, wherein when the resource management process performs the operation of receiving, from the hierarchical arrangement of icons, a selection of the host element, the storage element and the connectivity element the resource management process performs the operations of:

receiving a group definition including a selection of user selected elements from the hierarchical arrangement of icons associated with host elements, storage elements, and connectivity elements;

associating, to the group definition, the user selected elements as well as elements defined by element definitions in at least one element database that are hierarchically related below element definitions corresponding to the user selected elements; and wherein when the resource management process performs the operations of displaying the user selection of elements, the resource management process performs the operations of:

displaying a group icon to represent the group definition within the network display area of the network topology view on the display of the computerized device; and displaying at least one coupling condition as a link extending from the group icon to at least one other element icon in the network topology view to represent a connection from a device corresponding to at least one user selected element in the group definition to at least one other device corresponding to the at least one other element icon, wherein when the resource management process performs the operation of displaying a group icon, the resource management process performs the operations of:

displaying the group icon in collapsed form, such that user selected elements within the group definition represented by the group icon are not individually displayed in the network topology view; and wherein the resource management process performs the operations of:

receiving a group expansion request from a user to expand the group icon such that at least one coupling condition existing between the user selected elements within the group is visually displayed to the user; and in response to receiving the group expansion request, operating a group display mechanism to perform the operations of:

displaying at least a portion of the user selected elements included in the group definition in the network topology view on the display of the computerized device, each element of the portion of the display user selected elements being displayed in a respective display area associated with a element type associated with that element;

determining a set of group coupling conditions that exist between the portion of the user selected elements included in the group definition that were displayed in the network topology view; and displaying the set of group coupling conditions that exist between the displayed portion of the user selected elements included in the group definition such that a user providing the group expansion request can view an interconnection of those elements within the group.

27. The computerized device of claim 26 wherein when the resource management process performs the operation of determining a coupling condition for the connectivity element in relation to at least one of the host element and the storage element the resource management process performs the operations of:

querying the network element database to determine if the host element has a coupling associated with the connectivity element; and querying the network element database to determine if the storage element has a coupling associated with the connectivity element;

and wherein the resource management process performs the operations of displaying the coupling condition the resource management process performs the operations of:

if the host element has a coupling associated with the connectivity element, drawing a visual coupling between the host element and the connectivity element; and if the storage element has a coupling associated with the connectivity element, drawing a visual coupling between the storage element and the connectivity element.

28. The computerized device of claim 26 wherein when the resource management process performs the operation of displaying a group icon the resource management process performs the operation of:

displaying at least one group view control mechanism in the network topology view, the group view control mechanism providing the user with the ability to control group expansion and collapse operations associated with elements included in the group definition associated with the group icon.

29. The computerized device of claim 28 wherein the resource management process performs the operations of:

detecting a user operation of the at least one group view control mechanism in order to provide a group expansion request for elements included in the group definition that are currently displayed in the network topology view for that group definition; and in response to detecting a user operation:

displaying top-level host elements, connectivity elements and storage elements associated with the group definition in respective display areas assigned to each of such elements in the network topology view; and displaying coupling conditions between the top-level host elements, connectivity elements and storage elements associated with the group definition in the network topology view.

30. The computerized device of claim 29 wherein the resource management process performs the operations of:

detecting a subsequent user operation of the at least one group view control mechanism in order to provide a subsequent group expansion request for elements included in the group definition that are currently displayed in the network topology view for that group definition; and for each currently displayed element in the group definition, querying a respective element definition within the at least one element database to determine if that element definition contains a relation to any child element definitions one hierarchical level below that element definition in the at least one element database, and if so, displaying child elements in the network topology view for the child element definitions one hierarchical level below that element definition in the at least one element database; and displaying coupling conditions between the child elements and parent elements in the network topology view on the display of the computerized device such that a user can visualize parent-child couplings of elements in the network topology view.

31. The computerized device of claim 29 wherein when the resource management process performs the operation of displaying child elements in the network topology view the resource management process performs the operation of:

automatically aligning, within columns in respective display areas associated with the parent elements, each child element in relation to the parent element such that a user viewing the network topology view can readily ascertain which child elements are child elements of which parent elements.

32. The computerized device of claim 28 wherein the resource management process performs the operation of:

detecting user operation of the at least one group view control mechanism in order to provide a group collapse request for elements included in the group definition that are currently displayed in the network topology view for that group definition;

for each currently displayed element in the group definition, querying a respective element definition within the at least one element database to determine if that element definition is a child element definition of a parent element definition related one hierarchical level above that child element definition in the at least one element database, and if so, performing steps of:

removing, from the network topology view, the currently displayed element corresponding to that child element definition; and displaying, if not already displayed, an element in the network topology view that corresponds to the parent element definition related one hierarchical level above that child element definition in the at least one element database;

and after performing the steps of removing the currently displayed element and displaying the parent element for each currently displayed element in the group definition, performing the steps of:

determining coupling conditions that exist between each displayed parent element definition and element definitions corresponding to other displayed elements in the network topology view; and displaying, in the network topology view, the coupling conditions that exist between each displayed parent element definition and the element definitions corresponding to other displayed elements in the network topology view.

33. The computerized device of claim 28 wherein the group view control mechanism is at least one of a group combination selection mechanism and a group quick collapse mechanism; and wherein when the resource management process performs the operation of displaying a group icon the resource management process performs the operation displaying group element icons that are members of a common group in a format that differentiates the group element icons from other element icons in the network topology view such that a user can visually associate the group element icons to one another based on the format.

34. The computerized device of claim 26 wherein the resource management process performs the operations of:

displaying a hierarchical arrangement of icons including a set of zone selections, each zone selection being associated with a collection of devices configured to operate in a zone within a storage area network;

receiving a user zone selection from the set of zone selections displayed in the hierarchical arrangement of icons;

displaying, in the network topology view, zone elements that have corresponding element definitions in at least one element database that indicate that a device to which that element definition corresponds is configured to operate in the zone within the storage area network that corresponds to the user zone selection; and displaying, in the network topology view, zone coupling conditions between each displayed zone element in a format that differentiates the zone coupling conditions from non-zone coupling conditions.

35. The computerized device of claim 26 wherein the resource management process performs the operation of:

receiving a selection of an element displayed in the network topology view;

detecting user activation of a show neighbor mechanism in relation to the selected element; and in response to detecting user activation of the show neighbor mechanism, operating on the network topology view to display the selected element and any neighbor elements displayed in display areas adjacent to the display area of the selected element and that maintain a coupling condition with the selected element.

36. The computerized device of claim 35 wherein when the resource management process performs the operation of operating on the network topology view to display the selected element and any neighbor elements the resource management process performs the operations of:
  determining, for a selected element definition associated with the selected element in at least one element database, any neighbor element definitions that have a direct coupling condition to the selected element definition and that if displayed as an element in the network topology view, would be displayed in an adjacent display area of the network topology view that is adjacent to the display area associated with the selected element;
  displaying, in the network topology view, only
    i) the selected element in the display area associated with an element type of the selected element; and
    ii) a neighbor element for each neighbor element definition determined in the step of determining any neighbor element definitions; and
  displaying, in the network topology view, any coupling conditions that exist between the displayed selected element and the displayed neighbor elements.

37. The computerized device of claim 26 wherein the resource management process performs the operations of:
  detecting a management event associated with an element definition in at least one element database, the element definition corresponding to at least one of the host element, the connectivity element and the storage element displayed on the network topology view; and
  modifying a display attribute of an element displayed on the network topology view that corresponds to the element definition to which the detected management event is associated in order to reflect the detected management event, such that a visual indication of the detected management event is provided to a user viewing the network topology view on the display of the computerized device.

38. The computerized device of claim 26 wherein the resource management process performs the operations of:
  receiving a user link toggle selection; and
  in response to the user link toggle selection, removing the coupling condition displayed as a link on the network topology view.

39. The computerized device of claim 26 wherein the coupling condition displayed on the network topology view defines a logical coupling representing at least one actual physical coupling existing between an connectivity device associated with the connectivity element and at least one of a host device and a storage device associated with the at least one host element and storage element displayed on the network topology view.

40. The computerized device of claim 26 wherein:
  the connectivity element represents at least one switch that operates in a storage area network;
  the host element represents at least one host computer operating in the storage area network;
  the storage element represents at least one storage device operating in the storage area network; and
  coupling conditions displayed as a link on the network topology view represents at least one physical coupling between the at least one host computer and the at least one switch and between the at least one switch arid that at least one storage device operating in the storage area network.

41. The computerized device of claim 40 wherein an element displayed in a display area of the network topology display is a parent element that represents a plurality of actual devices associated with that parent element, and wherein the resource management process performs the operations of:
  receiving a selection of the parent element; and
  expanding a display of the selected parent element within the respective display area in which that selected parent element is displayed in the network topology view, the expanded display of that parent element including a display of respective child elements corresponding to each of the plurality actual devices represented by the parent element, such that a user viewing the network topology view can visually identify the child elements that correspond to the specific actual child devices associated with a parent device represented by the selected parent element.

42. The computerized device of claim 41 wherein when the resource management process performs the operation of expanding the display of the selected parent element the resource management process performs the operations of:
  automatically aligning the child elements displayed in relation to the parent element such that a parent-child element relationship is visually conveyed to the user view the network topology display and such that all child elements for a parent element are displayed within the display area of the network topology view associated wit the parent element;
  removing all coupling conditions displayed in the network topology view from the selected parent element to any other elements in the network topology view;
  displaying coupling conditions that exist between the selected parent element and its associated displayed child elements; and
  displaying coupling conditions that exist between each respective child element of the selected parent element and other elements that are displayed in the network topology view that are different that the selected parent element.

43. The computerized device of claim 42 wherein:
  the parent element represents a switch fabric and wherein the child elements represent individual storage area network switches within the switch fabric.

44. The computerized device of claim 26 wherein the resource management process performs the operations of:
  maintaining a database containing at least one respective element definition for each device within a storage area network;
  detecting an occurrence of a connection condition between at least two devices corresponding to elements in the network topology view, the connection condition reflecting at least one of an existence of a new connection between the at least two devices and removal of an existing connection between the at least two devices; and
  in response to detecting occurrence of the connection condition, dynamically altering the network topology view to correspond to the occurrence of a connection condition such that if the connection condition reflects the existence of the new connection between the at least two devices, a coupling condition is displayed as a link in the network topology view between the elements corresponding to the at least two devices, and such that if the connection condition reflects the removal of an existing connection between the at least two devices, a coupling condition is removed as a link in the network topology view between the elements corresponding to the at least two devices, such that a user viewing the network topology view sees the dynamically altered network topology view in response to the connection change between the at least two devices.

45. The computerized device of claim 26 wherein the resource management process performs the operations of:
automatically categorizing elements of at least one common type into an arranged group element such that the arranged group element represents a categorized elements;
receiving a user selection of the arranged group element; and
expanding the arranged group element to display child elements of the arranged group element corresponding to the automatically categorized elements of the at least one common type.

46. The computerized device of claim 26 wherein the resource management process performs the operations of:
receiving a user selection of an element;
detecting a user move operation of the element;
in response to detecting the user move operation, operating an element move mechanism to allow the user to move the element to another location in the network topology display, the user move operation including at least one of:
moving the element into at least one group;
moving the element into at least one other display area in the network topology view; and
moving the element into at least one other location of the display area currently corresponding to the element.

47. A computer program product having a computer-readable medium including computer program logic encoded thereon that, when executed on a computerized device having a coupling of a memory system, a processor, and a display that displays a graphical user interface, and wherein when the computer program logic is executed on the processor, the computer program logic provides a method for visualizing network resources by causing the processor to perform the operations of:
displaying a host element in a host display area of a network topology view on the display of the computerized device;
displaying a storage element in a storage display area of the network topology view on the display of the computerized device;
displaying a connectivity element in a network display area of the network topology view on the display of the computerized device, the network display area displayed in between the host display area and the storage display area on the display of the computerized device;
determining a coupling condition of the connectivity element in relation to at least one of the host element and the storage element; and
displaying the coupling condition as a link on the display of the computerized device between the connectivity element and the at least one of the host element and the storage element to which that coupling condition relates in order to visually convey the coupling condition to a user viewing the network topology view on the display of the computerized device,
the resource management process performing the further operations of:
receiving a user expansion selection of an element displayed on the network topology view; and
performing element expansion processing to display child elements associated with the element for which the user expansion selection was received, the child elements being positioned within the display area of the network topology view associated with the selected element,
wherein child elements represent interface devices associated with at least one of the host element, connectivity element and storage element displayed in the network topology view and wherein the resource management process performs the operations of:
receiving a user link toggle selection indicating the user does not desire to view the coupling conditions, and in response, removing coupling conditions from the network topology view; and
detecting movement of a user selection device within a predetermined distance of an element icon, and in response, displaying only coupling conditions in the network topology display related to that element icon for which the user selection mechanism is within the predetermined distance, thus indicating to the user only those coupling conditions related to the icon element nearby the user selection mechanism.

* * * * *

UNITED STATES PATENT AND TRADEMARK OFFICE
CERTIFICATE OF CORRECTION

| | | |
|---|---|---|
| PATENT NO. | : 7,315,985 B1 | Page 1 of 1 |
| APPLICATION NO. | : 10/335330 | |
| DATED | : January 1, 2008 | |
| INVENTOR(S) | : Francois Gauvin et al. | |

It is certified that error appears in the above-identified patent and that said Letters Patent is hereby corrected as shown below:

Claim 40, Col. 50, Line 1, "at least one switch arid that" should read --at least one switched and that--
Claim 42, Col. 50, Line 32, "associated wit the parent" should read --associated with the parent--

Signed and Sealed this

First Day of July, 2008

JON W. DUDAS
*Director of the United States Patent and Trademark Office*